US012759419B2

(12) United States Patent
Archambo et al.

(10) Patent No.: US 12,759,419 B2
(45) Date of Patent: Oct. 13, 2026

(54) VEHICLE WITH POWER CONVERSION UNIT

(71) Applicant: Oshkosh Defense, LLC, Oshkosh, WI (US)

(72) Inventors: Christopher Archambo, Oshkosh, WI (US); Matthew Acton, Oshkosh, WI (US); Nicholas Kopec, South Lyon, MI (US)

(73) Assignee: Oshkosh Defense, LLC, Oshkosh, WI (US)

( * ) Notice: Subject to any disclaimer, the term of this patent is extended or adjusted under 35 U.S.C. 154(b) by 0 days.

(21) Appl. No.: 18/802,750

(22) Filed: Aug. 13, 2024

(65) Prior Publication Data

US 2024/0399904 A1 Dec. 5, 2024

Related U.S. Application Data

(60) Provisional application No. 63/621,350, filed on Jan. 16, 2024, provisional application No. 63/622,054, filed on Jan. 17, 2024.

(51) Int. Cl.
*B60L 1/12* (2006.01)
*B60L 50/52* (2019.01)
(Continued)

(52) U.S. Cl.
CPC ................. *B60L 53/22* (2019.02); *B60L 1/12* (2013.01); *B60L 50/52* (2019.02); *B60L 50/60* (2019.02);
(Continued)

(58) Field of Classification Search
CPC .. B60L 1/00; B60L 1/003; B60L 1/006; B60L 1/02; B60L 1/04; B60L 1/08; B60L 1/10; B60L 1/12; B60L 1/14; B60L 1/16; B60L 50/50; B60L 50/51; B60L 50/52; B60L 50/60; B60L 53/20; B60L 53/22;
(Continued)

(56) References Cited

U.S. PATENT DOCUMENTS 8,134,343 B2 * 3/2012 Like ........................ B60R 16/04
320/166
2007/0114954 A1 * 5/2007 Hampo .................. B60L 3/003
318/105

(Continued)

OTHER PUBLICATIONS

Non-Final Office Action on U.S. Appl. No. 18/759,136 dated Mar. 11, 2026.

*Primary Examiner* — Levi Gannon
(74) *Attorney, Agent, or Firm* — Foley & Lardner LLP

(57) ABSTRACT

A power conversion unit can include a housing, a first converter module, and a second converter module. The housing can define a shape of the power conversion unit, provide a first slot to receive the first converter module, provide a second slot to receive the second converter module. The first converter module can electrically couple with a first power source, and the first converter module can establish a first bi-directional flow of electrical power between a voltage bus of the power conversion unit and the first power source. The second converter module can electrically couple with a second power source, and establish a second bi-directional flow of electrical power between the voltage bus of the power conversion unit and the second power source.

20 Claims, 21 Drawing Sheets

(51) Int. Cl.

| | |
|---|---|
| ***B60L 50/60*** | (2019.01) |
| ***B60L 53/22*** | (2019.01) |
| ***B60L 55/00*** | (2019.01) |
| ***H02J 3/32*** | (2026.01) |

(52) U.S. Cl.

CPC .............. *B60L 55/00* (2019.02); *H02J 3/322* (2020.01); *B60L 2210/10* (2013.01); *B60L 2210/30* (2013.01)

(58) Field of Classification Search

CPC .......... B60L 53/24; B60L 55/00; B60L 58/18; B60L 58/20; B60L 58/21; B60L 2210/10; B60L 2210/12; B60L 2210/14; B60L 2210/20; B60L 2210/22; B60L 2210/30; B60L 2210/40; H02J 3/322

See application file for complete search history.

(56) References Cited

U.S. PATENT DOCUMENTS

| | | | | |
|---|---|---|---|---|
| 2009/0315393 | A1* | 12/2009 | Yeh | B60L 1/00 307/10.1 |
| 2010/0117585 | A1 | 5/2010 | Fitch et al. | |
| 2010/0231169 | A1* | 9/2010 | Hashim | B60L 55/00 320/134 |
| 2010/0315043 | A1* | 12/2010 | Chau | B60L 58/10 320/134 |
| 2012/0013182 | A1* | 1/2012 | Minegishi | B60L 50/61 307/9.1 |
| 2016/0311328 | A1* | 10/2016 | Kim | B60L 50/64 |
| 2017/0015200 | A1 | 1/2017 | Hatanaka | |
| 2019/0260293 | A1* | 8/2019 | Kurokawa | H02M 3/158 |
| 2020/0122580 | A1* | 4/2020 | Zou | B60L 53/30 |
| 2021/0086629 | A1* | 3/2021 | Ruppert | B60L 58/20 |
| 2021/0155100 | A1* | 5/2021 | Khaligh | B60L 55/00 |
| 2021/0170890 | A1* | 6/2021 | Iyer | H02J 7/1492 |
| 2023/0155395 | A1* | 5/2023 | Nolte | H02M 3/33584 320/118 |
| 2023/0178976 | A1 | 6/2023 | Nakagawa | |
| 2024/0376978 | A1 | 11/2024 | Kotloski et al. | |
| 2024/0399904 | A1 | 12/2024 | Archambo et al. | |

* cited by examiner

VEHICLE WITH POWER CONVERSION UNIT

CROSS-REFERENCE TO RELATED PATENT APPLICATION

This application claims the benefit of and priority to U.S. Provisional Application No. 63/622,054, filed Jan. 17, 2024, and U.S. Provisional Application No. 63/621,350, filed Jan. 16, 2024, the entire disclosures both of which are incorporated by reference herein in their entireties.

BACKGROUND

The present disclosure relates to power distribution. More specifically, the present disclosure relates to a power distribution unit.

SUMMARY

One embodiment of the present disclosure relates to a vehicle. The vehicle can include a first power source. The first power source can supply electrical power to one or more components of the vehicle. The vehicle can include a frame. The vehicle can include a power conversion unit. The power conversion unit can couple with the frame. The power conversion unit can include a housing. The housing can define a shape of the power conversion unit. The housing can provide a first slot to receive a first converter module and a second slot to receive a second converter module. The first converter module can electrically couple with the first power source. The first converter module can establish a first bi-directional flow of electrical power between a voltage bus of the power conversion unit and the first power source. The second converter module can electrically couple with a second power source. The second converter module can establish a second bi-directional flow of electrical power between the voltage bus of the power conversion unit and the second power source.

One embodiment relates to a system. The system can include a vehicle. The vehicle can include a first power source. The first power source can supply electrical power to one or more components of the vehicle. The vehicle can include a frame. The system can include a power conversion unit. The power conversion unit can couple with the frame. The power conversion unit can include a housing. The housing can define a shape of the power conversion unit. The housing can provide a first slot to receive a first converter module and a second slot to receive a second converter module. The first converter module can electrically couple with the first power source. The first converter module can establish a first bi-directional flow of electrical power between a voltage bus of the power conversion unit and the first power source. The second converter module can electrically couple with a second power source. The second converter module can establish a second bi-directional flow of electrical power between the voltage bus of the power conversion unit and the second power source.

One embodiment relates to a power conversion unit. The power conversion unit can include a housing. The housing can define a shape of the power conversion unit. The housing can provide a first slot to receive a first converter module and a second slot to receive a second converter module. The first converter module can electrically couple with a first power source. The first converter module can establish a first bi-directional flow of electrical power between a voltage bus of the power conversion unit and the first power source. The second converter module can electrically couple with a second power source. The second converter module can establish a second bi-directional flow of electrical power between the voltage bus of the power conversion unit and the second power source.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
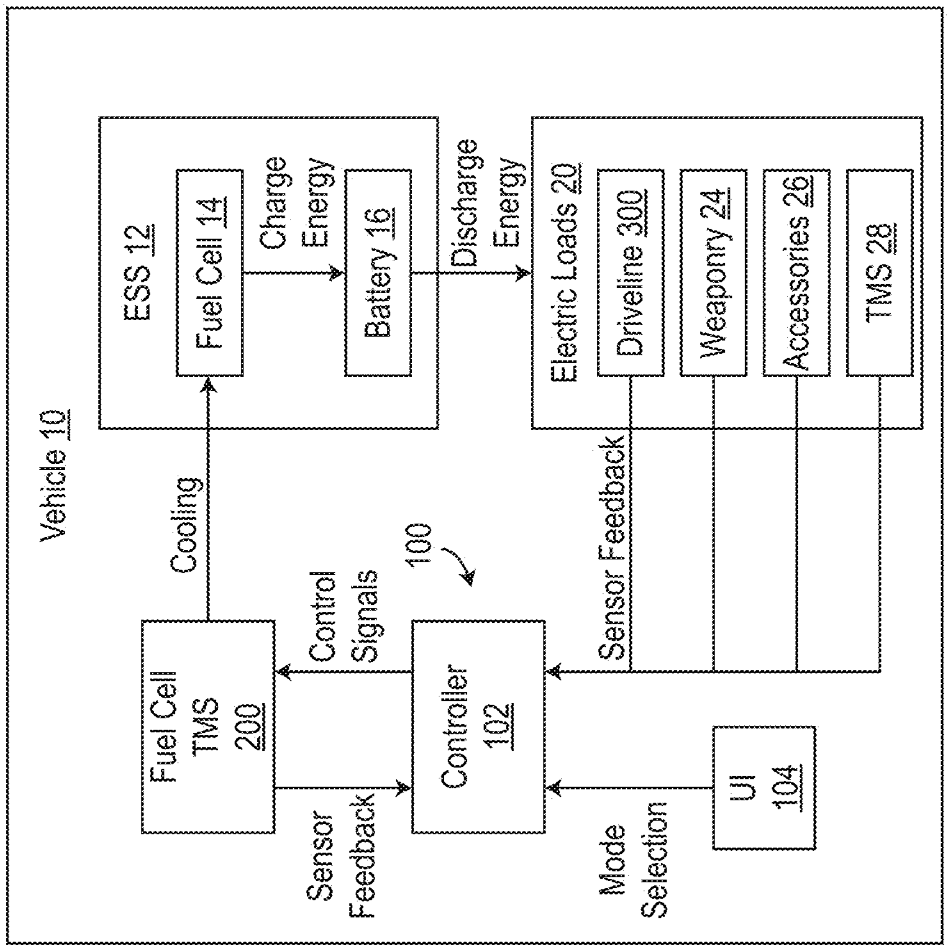
FIG. 1 is a block diagram of a vehicle including a fuel cell and a fuel cell thermal management system, according to some embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Referring generally to the FIGURES, a power conversion unit to coordinate electrical power conversion between devices having various power specifications is described herein. For example, the power conversion unit can coordinate power conversion between one or more batteries that drive a motor of a vehicle and one or more computing devices (e.g., tablets, monitors, computers, etc.). The power conversion unit may coordinate power conversion such that the computing devices receive electrical power in accordance with a power specification of the computing devices. For example, the amount of electrical power provided to the motor may be different from the amount of electrical power provided to the computing devices. Additionally, the power conversion unit may serve as an electrical power transfer device between devices that may otherwise be unable to directly couple with one another (e.g., different equipment, different electrical requirements, different protocols, etc.).

As an example, the power conversion unit may serve as a power distribution system in a contested environment (e.g., a battleground, military excursion, etc.) to provide electrical power when one or more sources (e.g., electric grids, generators, etc.) may be unable and/or damaged. The power conversion unit may provide power to devices such as, communication equipment, observation systems, and weaponry systems. Additionally, the power conversion unit may provide continuous and uninterrupted power by coordinating electrical power conversion between various devices. The power conversion unit can also isolate and/or otherwise disconnect damaged or malfunctioning subsystems to prevent a total failure of the system. The power conversion unit may be implemented as a rack style modular power conversion system which converts and transfers power between power sources and loads. For example, the power conversion unit may include one or more power converter modules that can be easily removed, replaced, and/or swapped out. The swappable functionality of the power conversion unit provides a customizable operation of the power conversion unit such that the power conversion unit can be configured for specific loadouts and/or power requirements.

The power conversion unit may include one or more standalone power conversion modules to distribute and/or convert power between various sources (e.g., alternating current (AC) sources, direct current (DC) sources, etc.). The power conversion unit can implement and/or utilize an architecture and/or control methodology that conforms with a tactical microgrid standard (TMS). The power conversion unit can be modular such that one or more components may be added, removed, replaced, relocated, or otherwise changes based on a given implementation of the power conversion unit. The modularity and/or flexibility of the power conversion unit allows for various power sources (e.g., generators, renewable energy sources, energy storage systems, grid power, microgrid power, LV batteries, etc.) to provide power to one or more power converters of the power conversion which subsequently can power one or more connected devices. For example, the power conversion unit may receive electrical power from a first device to power a conversion module which subsequently provides power to an electric vehicle to charge one or more batteries of the electric vehicle.

The power conversion unit may receive power from one or more sources and the power conversion unit may distribute the power to one or more circuits and/or devices connected to the power conversion unit. For example, the power conversion unit may receive power from a commercial grid and the power conversion unit may distribute the power, from the commercial grid, to one devices connected to the power conversion unit. As another example, the power conversion unit may be integrated with and/or include passthrough connections that that power conversion unit may tap into and/or receive power from power sources of a vehicle. The power conversion unit may include circuitry and/or hardware to provide various functionality, such as circuitry to implement fast charging according to the CCSI protocol, circuitry to provide vehicle to grid power export, circuitry compatible with microgrid specifications, circuitry that converts residential and/or industrial grid power to clean miliary equipment AC power.

The power conversion unit may refer to and/or be implemented as a standalone power distribution module that includes bi-directional flow that corresponds to ports and/or devices associated with LV DC power, Hv DC power, AC power, DC to AC, AC to DC, DC to DC, and/or AC to AC. The power conversion unit may include control systems and/or control modules to determine and/or measure the voltage of an export device and/or export port such that a common bus of the power conversion unit may be adjusted to conform to and/or correspond to the voltage of the export device.

The power conversion unit may include one or more power converter modules installed in a rack system such that the one or more power converter modules may be replaced, substituted, and/or supplemented by one or more second power converter modules. The power converter modules may include controllers to control devices such as electrical converters, electrical circuitry, and/or additional systems included in a given power converter module. The power conversion unit and/or one or more power converter modules thereof may include an external interface panel that includes electrical connectors and/or a power switch.

The power converter modules include one or more connections. For example, the power converter modules may include a low voltage (LW) signal connection, a high voltage (HV) DC power connection, a ground electrical connection, and a hydraulic coolant connection. As another example, the power converter modules may include interface connections, communication connections (controller area network (CAN) bus, local area network (LAN) connections, ethernet connections, etc.). The various connections of the power converter modules may include one or more characteristics and/or standards. For example, the LV signal connections may be rated for 24 VDC at 5 amps. As another example, the HV DC connectors may be rated for 300 amps of continuous current. As another example, the power converter modules may be rated for voltage levels in excess of 900 VDC.

In some embodiments, the power conversion unit may include a structure and/or shape, such as a box, a package design, and/or a container to house and/or otherwise store the components, circuitry, and/or hardware of the power converter modules. The power conversion unit may also include at least one of system assemblies, subsystem assemblies, electrical systems, wiring, cooling systems, export connectors, mounting solutions, and/or mounting connections. The power conversion unit may be compatible one or more standards and/or protocols such that the power conversion unit may be compatible (e.g., plug and play, etc.) with various HV buses. The power conversion unit may provide an interface for one or more fuel cell stack outputs such that the power conversion unit may receive power from one or more fuel cells. The power conversion unit may also include an electrical export interface such that the power conversion unit may provide power to one or more connected devices.

The power conversion unit may include bus isolation monitoring such that one or more devices, connected to the bus, may be disconnected from and/or removed from the bus to maintain the integrity and/or operation of the bus. For example, the power conversion unit may electrically decouple a malfunctioning and/or damage power converter module from a voltage bus to prevent the power converter module from interfering with the operation of the voltage bus and/or the power conversion unit. As another example, the export connections may be isolated such that a first export connection does not interfere with a second export connection.

The power conversion unit may establish bi-directional flow between one or more components such that the power conversion unit may receive electrical power from various sources and/or provide electrical power with the various sources. For example, the power conversion unit may establish a bi-directional between with a given device such that power conversion unit may (1) receive, from the given device, electrical power while the given device is acting as a power supply and (2) provide, to the given device, electrical power while given device is acting as a load on the power conversion unit.

Overall Vehicle

According to the exemplary embodiment shown in FIG. 1, a vehicle 10 (e.g., a heavy duty vehicle, a commercial vehicle, a tank, a military vehicle, a truck, a machine, a boat, a hull, a rotational propulsive system, an electric vehicle, an autonomous vehicle, etc.) includes an energy storage system (ESS) 12, a fuel cell thermal management system (TMS) 200, one or more electric loads 20, and a control system 100. The vehicle 10 may also include a body (e.g., a shell, a cab, a cabin assembly, etc.), a chassis (e.g., a frame, a hull, a carriage, etc.), tractive elements, and a primary mover (e.g., a diesel engine, a gasoline engine, an internal combustion engine, an electric motor, etc.). The primary mover and the body can be supported by (e.g., fixedly coupled with) the chassis. In some embodiments, the primary mover is coupled with the chassis (e.g., secured, fastened, or otherwise attached on the chassis). The primary mover outputs mechanical energy in the form of torque (e.g., by driving a shaft to rotate), which can be transferred through a transmission or a driveline to transport the vehicle 10. In some embodiments, the primary mover is configured to drive the tractive elements to rotate to thereby transport the vehicle along a ground surface. The vehicle can also include a steering system that receives steering input from an operator (e.g., an on-board operator, or a remote operator) and rotates two or more of the tractive elements to indicate a turn. In some embodiments, the chassis, the body, and the primary mover are supported by the tractive elements. If the controller 102 is implemented for a vehicle having an internal combustion engine, the controller 102 may monitor exhaust gas an exhaust gas temperatures in order to reduce thermal and/or acoustic signatures of the vehicle 10 or to perform any of the modes described in greater detail below.

The ESS 12 is configured to provide electrical energy to the one or more electric loads 20 of the vehicle 10. In some embodiments, the ESS 12 includes a fuel cell 14, and one or more batteries, shown as battery 16 (e.g., electrical energy storage devices). The fuel cell 14 is configured to consume fuel and provide electrical energy to the battery 16 (e.g., charge energy) in order to maintain a sufficient charge level at the battery 16. The battery 16 is configured to output electrical energy (e.g., discharge energy) to any of the electric loads. The electric loads 20 can include a variety of electrical components, equipment, etc., including but not limited to a driveline 300, weaponry 24, accessories 26, and a thermal management system (TMS) 28 for occupants of the vehicle 10. In some embodiments, the control system 100 and any components of the control system 100 is also configured to receive electrical energy from the battery 16. The battery 16 can also provide electrical energy to the fuel cell TMS 200. It should be understood that the battery 16 of the ESS 12 may be configured to provide electrical energy for any components of the vehicle 10. The fuel cell 14 may be a hydrogen fuel cell, a methanol fuel cell, a natural gas fuel cell, etc. The vehicle 10 may be an electric or hybrid Light Reconnaissance Vehicle. In some embodiments, the vehicle 10 is a heavy duty vehicle, a tank, a fighting vehicle, etc.

The control system 100 includes a controller 102 and a user interface (UI) 104, according to some embodiments. The controller 102 is configured to receive sensor feedback or measurements from any sensors, devices, or systems of the vehicle 10 such as the driveline 300, the fuel cell TMS 200, the ESS 12 (e.g., from sensors associated with the battery 16 and/or the fuel cell 14), the weaponry 24, the accessories 26, and/or the TMS 28. In some embodiments, the controller 102 is configured to operate the fuel cell TMS 200 according to a variety of different modes. In some embodiments, the controller 102 uses any of the feedback or measurements described herein in order to determine controls for the fuel cell TMS 200 according to an active one of the modes. In some embodiments, the controller 102 is configured to receive a mode selection from the UI 104. The UI 104 may be disposed locally on the vehicle 10 if the vehicle 10 is a manned vehicle, or remotely from the vehicle 10 if the vehicle 10 is an autonomous or remotely controlled vehicle. The mode selection provided by the UI 104 may indicate a desired one of the modes of operation that an operator of the vehicle 10 wishes the controller 102 to operate in accordance with. The UI 104 may include one or more input devices, buttons, a touch screen, a display screen, etc. In some embodiments, the UI 104 is a human machine interface (HMI) configured to both display data associated with the vehicle 10 and to receive the mode selection. The controller 102 can use the mode selection to activate or switch between the different modes. In some embodiments, the controller 102 is configured to automatically switch between the different modes based on feedback, without requiring a user input.

Driveline

Figure 2:
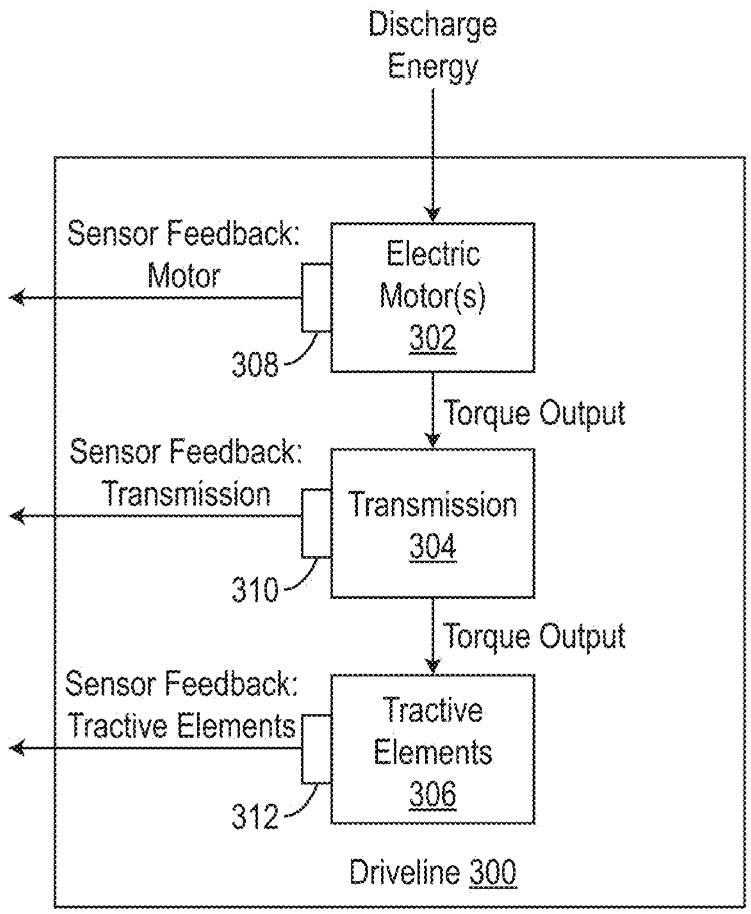
FIG. 2 is a block diagram of a driveline of the vehicle of FIG. 1, according to some embodiments.

Referring to FIG. 2, the driveline 300 includes one or more electric motors 302, a transmission 304, and tractive elements 306, according to some embodiments. In some embodiments, the electric motors 302 are configured to receive the discharge energy from the battery 16 and use the discharge energy to output a torque to the transmission 304 (e.g., a gearbox, a gearset, etc.). The transmission 304 is configured to receive the torque from the electric motors 302 and transfer or output a torque to the one or more tractive elements 306 in order to drive the tractive elements 306 to transport the vehicle 10. In some embodiments, the electric motors 302 include a sensor 308 configured to obtain sensor feedback of the motor 302 and provide the sensor feedback to the controller 102. In some embodiments, the sensor feedback of the motor 302 includes any of, or any combination of: a motor speed, a torque output, a power consumption, a voltage, etc., of the motor 302. In some embodiments, the transmission 304 includes a transmission sensor 310 that is configured to obtain sensor feedback of the transmission 304 and provide the sensor feedback to the controller 102. In some embodiments, the sensor feedback of the transmission 304 includes any of, or any combination of: transmission speed, current transmission gear, transmission power generation, etc. In some embodiments, the tractive elements 306 include a tractive element sensor 312 configured to obtain sensor feedback of the tractive elements 306 and provide the sensor feedback to the controller 102. The sensor feedback of the tractive elements 306 may include any or, or any combination of, wheel speed, vehicle speed, speed of rotation, speed of tractive elements, tractive element slippage, tire pressure, etc. The controller 102 can use any of the feedback obtained from the sensor 308, the sensor 310, or the sensor 312 in order to generate control signals or control decisions for the fuel cell TMS 200.

Figure 3:
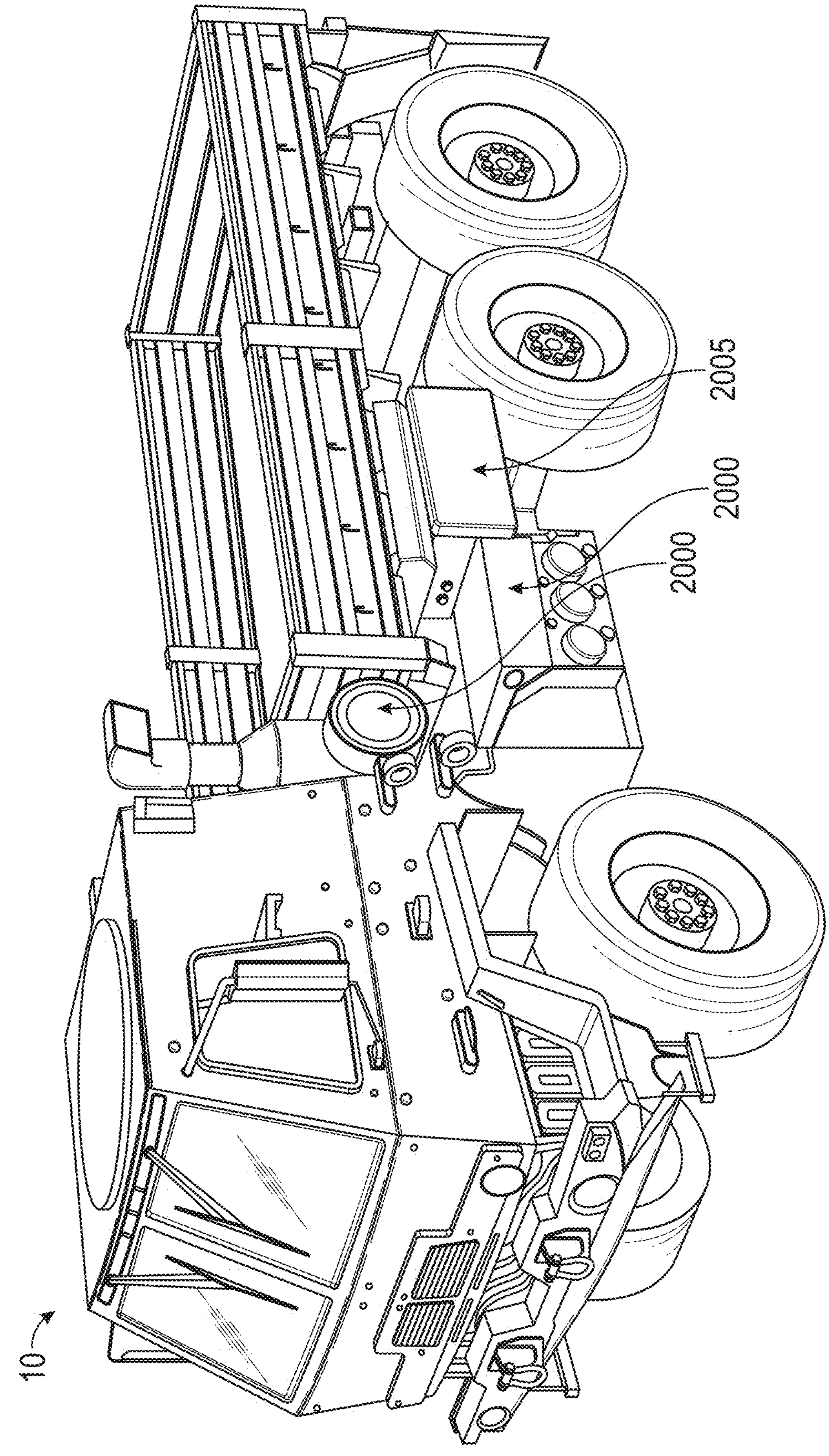
FIG. 3 is a perspective view of a vehicle including a power conversion unit, according to some embodiments.

FIG. 3 depicts a perspective view of the vehicle 10, according to some embodiments. In some embodiments, the vehicle 10 may include at least one of a military vehicle, a supply vehicle, a transport vehicle, a hybrid vehicle, an electric vehicle, and/or an autonomous vehicle. As shown in FIG. 3, the vehicle 10 includes at least one power source 2000 and at least one power conversion unit 2005. In some embodiments, the power source 2000 may include at least one of the various power sources and/or energy storage devices described herein. For example, the power source 2000 may include the ESS 12. As another example, the power source 2000 may include the fuel cells 14. In some embodiments, the power source 2000 can include at least one of batteries, an integrated starter generator (ISG), a transmission-integral generator (TIG), a hybrid system, battery packs, and/or electrical power storage devices.

In some embodiments, the power source 2000 may provide electrical power to one or more components of the vehicle 10. For example, the power source 2000 may provide electrical power to one or more motors of the vehicle 10 to operate one or more tractive elements. As another example, the power source 2000 may provide electrical power to one or more lighting devices to cause the vehicle 10 to emit light. As even another example, the power source 2000 may provide electrical power to one or more thermal management systems of the vehicle 10.

In some embodiments, the power conversion unit 2005 may be coupled with the vehicle 10. For example, the power conversion unit 2005 may be coupled with a frame and/or an undercarriage of the vehicle 10. As another example, the power conversion unit 2005 may be coupled with a panel or side structure of the vehicle 10. In some embodiments, the power conversion unit 2005 may be removably coupled with the vehicle 10. For example, the power conversion unit 2005 may be coupled with the vehicle 10 via one or more fasteners. In this example, the power conversion unit 2005 may be removed and/or decoupled from the vehicle 10 responsive to the removal of the one or more fasteners. As another example, the power conversion unit 2005 may be placed and/or secured inside of a compartment or other storage area. In this example, the power conversion unit 2005 may be removed and/or decoupled form the vehicle 10 responsive to removing the power conversion unit 2005 from the compartment.

In some embodiments, the power conversion unit 2005 may be portable and/or otherwise movable such that the power conversion unit 2005 may be relocated and/or otherwise utilized at one or more locations separate from the vehicle 10. For example, the power conversion unit 2005 may be located within a building. As another example, the power conversion unit 2005 may be located proximate to a power station and/or an electrical substation.

In some embodiments, the power conversion unit 2005 may power distribution and/or power conversion between one or more power sources (e.g., the power sources 2000, electric grid, energy banks, etc.) and one or more electrical devices such as, thermal management systems, computing systems (e.g., computers, servers, memory devices, tablets, monitors, smart phones, wearables, etc.), sensors, cameras, lighting equipment, temperate control devices (e.g., fans, air conditioning units, heating elements, etc.), telecommunication devices (e.g., antennas, receivers, transmitters, transceivers, network devices, etc.), and/or appliances (e.g., microwaves, refrigerators, induction cooking equipment, freezers, etc.).

Figure 4:
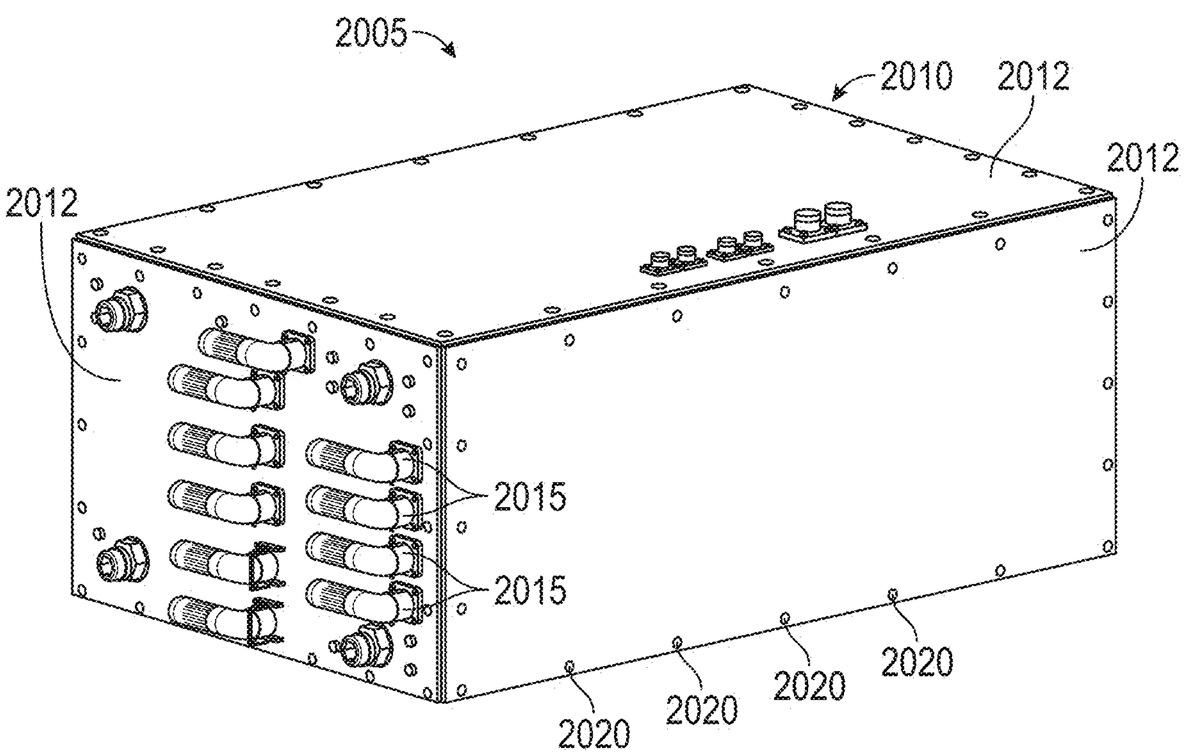
FIG. 4 is a perspective view of the power conversion unit illustrated in FIG. 3, according to some embodiments.

FIG. 4 depicts a perspective view of the power conversion unit 20005, according to some embodiments. FIG. 4 illustrates an example of the power conversion unit 2005 separate from the vehicle 10. Stated otherwise, FIG. 4 illustrates an example of the power conversion unit 2005 decoupled from and/or removed from the vehicle 10. In some embodiments, the power conversion unit 2005 may include at least one housing 2010. For example, the power conversion unit 2005 may include at least one of a body, an assembly, panels, structures, etc. that define and/or dictate a shape of the power conversion unit 2005. As shown in FIG. 4, the housing 2010 may include multiple panels 2012 to form or define the housing 2010. In embodiments, the panels 2012 may be coupled with another and/or one or more internal components of the power conversion unit 2005. For example, the panels 2012 may be coupled with one or more brackets of the power conversion unit 2005 via one another via fasteners 2020. In some embodiments, at least one of the panels 2012 may be removed to provide access to an internal space of the power conversion unit 2005. For example, the fasteners 2020 may be removed to allow for a given panel 2012 to be removed such that one or more power converter modules of the power conversion unit 2005 may be accessible. In some embodiments, the power conversion unit 2005 may include at least one terminal 2015. For example, the power conversion unit 2005 may include at least one of ports, interface slots, outlets, connectors, and/or electrical components to electrical couple one or more devices. In some embodiments, the terminals 2015 may be associated with and/or correspond to various power sources, energy devices, and/or power converter modules. For example, a first terminal 2015 may electrically couple a first device with a first power converter module of the power conversion unit 2005.

In some embodiments, the power conversion unit 2005 may establish one or more bi-directional flows of electrical power. For example, the power conversion unit 2005 may establish a bi-directional flow of electrical power between a first device and a second device such that the first device can provide electrical power to the second device and/or receive electrical power from the second device. Stated otherwise, the power conversion unit 2005 may establish a bi-directional flow of electrical such that the first device may be a power source and/or a load relative to the second device and/or vice versa.

In some embodiments, the power conversion unit 2005 (e.g., a power converter assembly, a power converter, etc.) may include various dimensions. For example, the power conversion unit 2005 may include a height of 15 inches. As another example, the power conversion unit 2005 may include a width of 23 inches. As even another example, the power conversion unit 2005 may include a length of 35 inches. As another example, the power conversion unit 2005 may include a volume of 50 gallons. In some embodiments, the dimensions (e.g., length, height, depth, width, thickness, etc.) may vary and/or depend on a number of power converter modules included in the power conversion unit 2005. For example, the power conversion unit 2005 may have one or more first dimensions based on the power conversion unit 2005 including a first number of power converter modules. Stated otherwise, the dimensions of the power conversion unit 2005 may change and/or vary based on the number of power converters included in the power conversion unit 2005.

Figure 5:
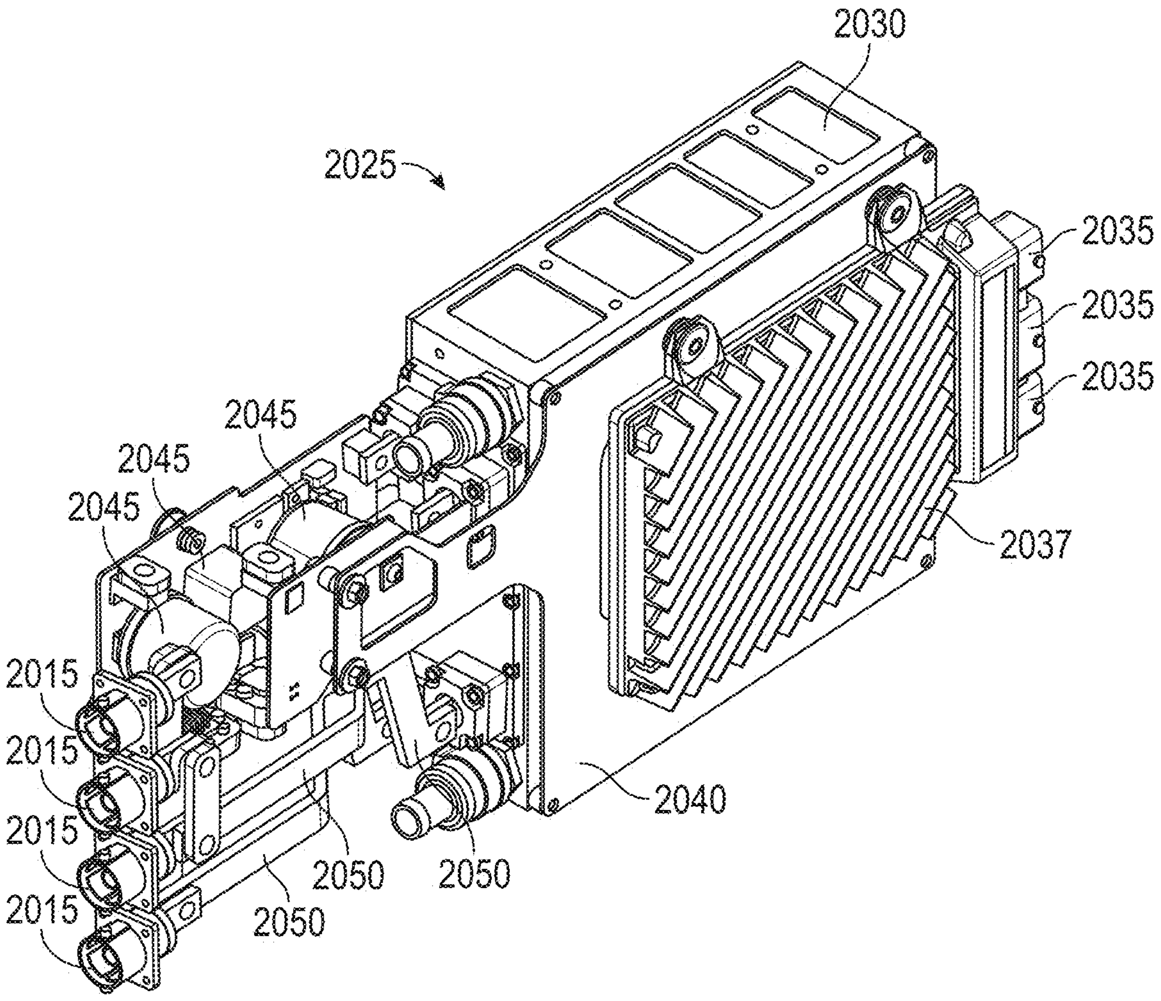
FIG. 5 is a perspective view of a converter module included in the power conversion unit illustrated in FIG. 4, according to some embodiments.
Figure 6:
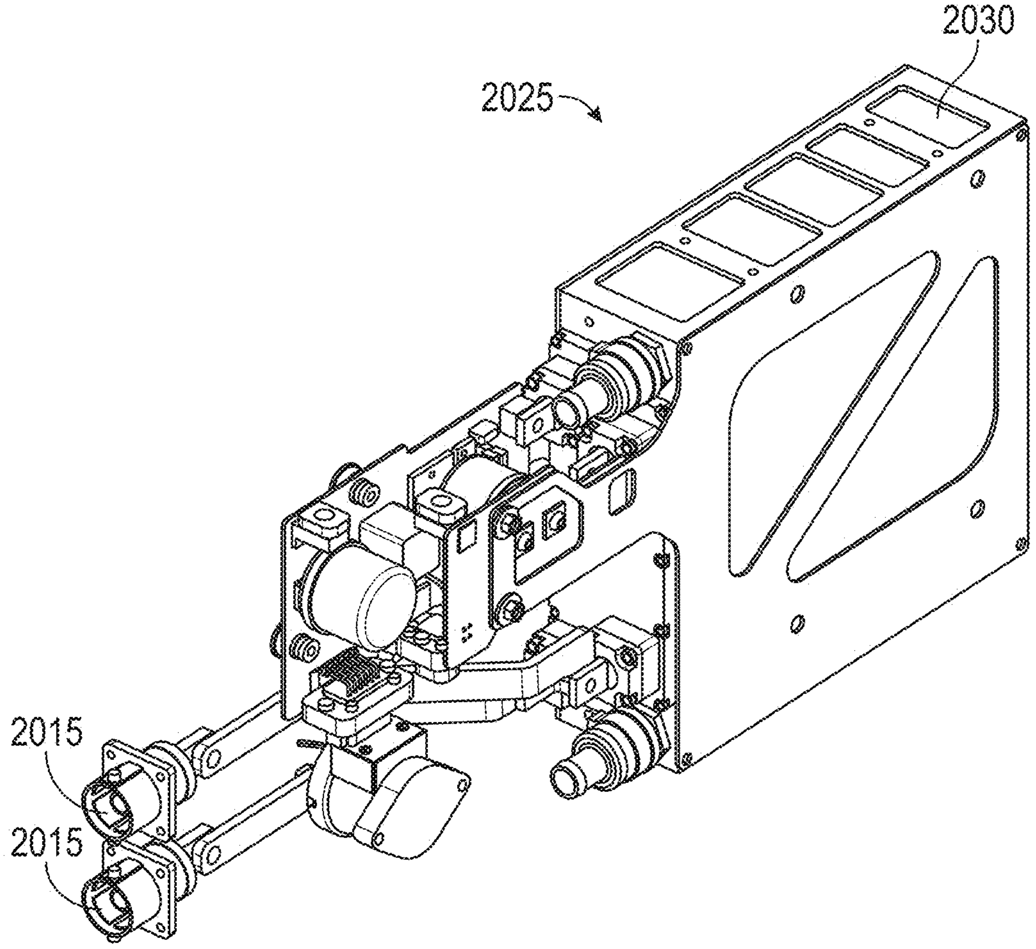
FIG. 6 is a perspective view of a converter module included in the power conversion unit illustrated in FIG. 4, according to some embodiments.
Figure 7:
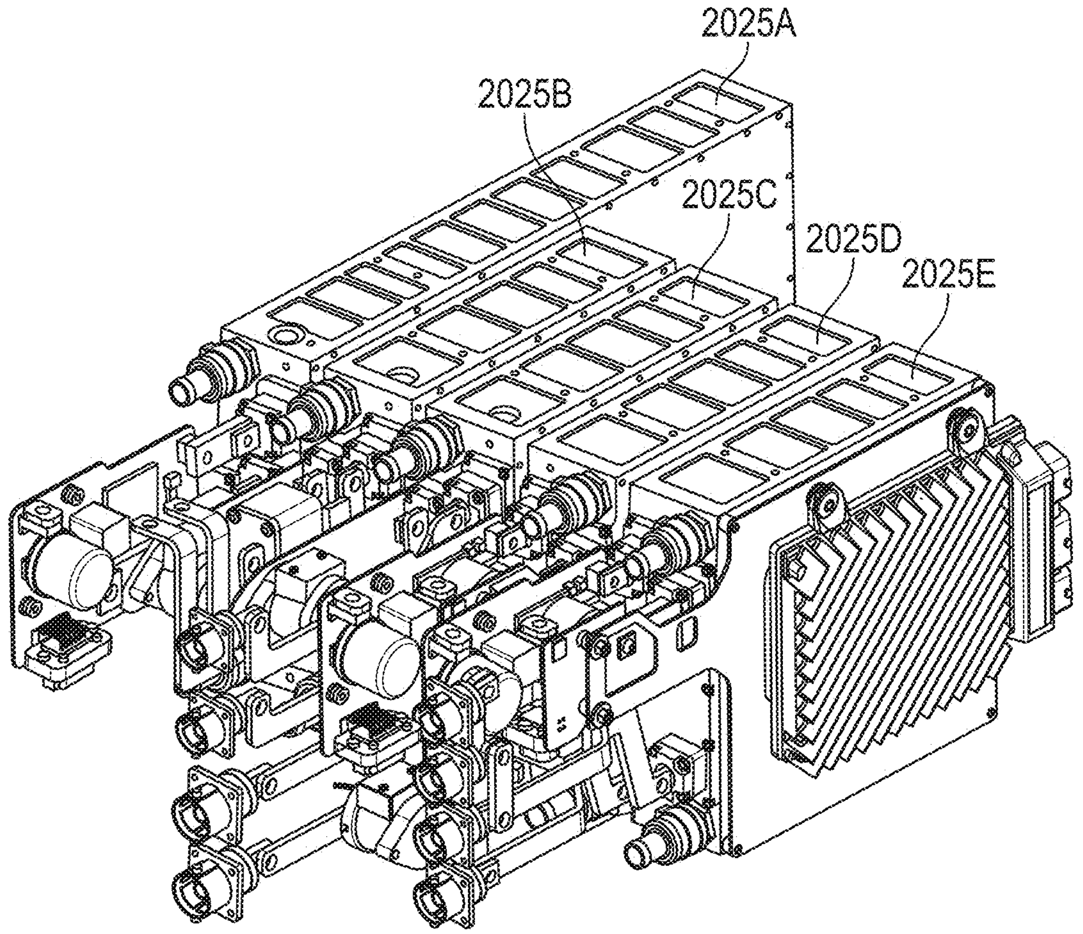
FIG. 7 is a perspective view of multiple converter modules coupled to one another, according to some embodiments.

FIGS. 5-7 depict perspective views of at least one power converter module 2025, according to some embodiments. The power converter module 2025 may include at least one of the power converter modules described herein. In some embodiments, the power conversion unit 2005 may include at least one slot to receive the power converter module 2025. For example, the power converter module 2025 may be inserted into and/or otherwise placed in the slot. In some embodiments, the power converter module 2025 may include at least one housing 2030, a terminal device 2035, a cooling system 2037, a plate 2040, components 2045, and brackets 2050.

In some embodiments, the housing 2030 may include at least one of hardware, circuitry, electrical components, electrical devices, etc. For example, the housing 2030 may include an alternating current (AC) to direct current (DC) converter. Stated otherwise, the housing 2030 may include a device that may receive AC signals (e.g., AC voltage, electrical signals having AC signatures, etc.) and convert the AC signals to DC signals (e.g., DC voltage, electrical signals having DC signatures, etc.). In some embodiments, the power converter modules 2025 may include terminals, connectors, ports, etc. to electrically couple with one or more electrical devices. For example, a first power converter module 2025 may include a first connector to electrically couple with the power sources 2000. As another example, the first power converter module 2025 may include a second connector to electrically couple with an electrical device (e.g., a thermal management system, a cooling system, a generator, etc.).

In some embodiments, the power converter modules 2025 may be stackable and/or otherwise coupled with one another. For example, as shown in FIG. 7, power converter modules 2025*a*, 2025*a*, 2025*c*, 2025*d*, and 2025*e* are shown coupled with one another such that the power converter modules 2025 are secured to one another. In some embodiments, the collection of power converter modules 2025 (e.g., the power converter modules coupled with one another) may be inserted into, placed, and/or otherwise located in the housing 2010.

Figure 8:
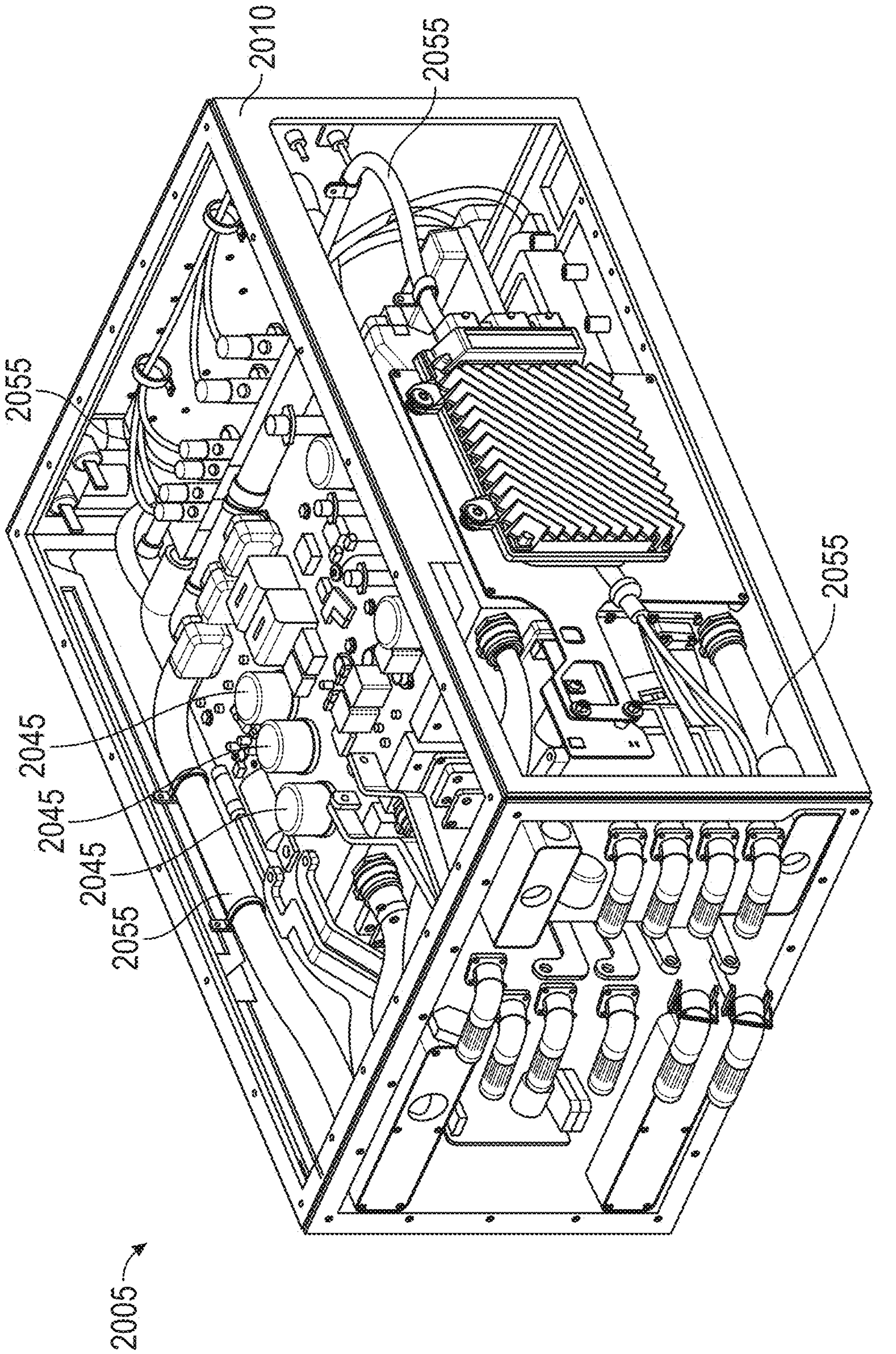
FIG. 8 is a perspective view of the power conversion unit illustrated in FIG. 4, according to some embodiments.

FIGS. 8-12 depict perspective views of the power conversion unit 2005, according to some embodiments. A shown in FIG. 8, a top panel or first panel 2012 has been removed to show the internal compartment (e.g., a space, void, area, etc.) defined by the housing 2010. In some embodiments, FIG. 8 illustrates an example of the power converter modules 2025*a*, 2025*a*, 2025*c*, 2025*d*, and 2025*e* disposed and/or otherwise located in the housing 2010.

In some embodiments, the power conversion unit 2005 may include at least one of cabling 2055 (e.g., cords, conduit, wires, etc.) to carry various electrical signals (e.g., voltage, current, power, etc.) between one or more components. For example, the cabling 2055 may provide electrical power from the terminals 2015 to the power converter module 2025. As another example, the cabling 2055 may provide electrical power to one or more sensors (e.g., components 2045) to power the sensors.

Figure 9:
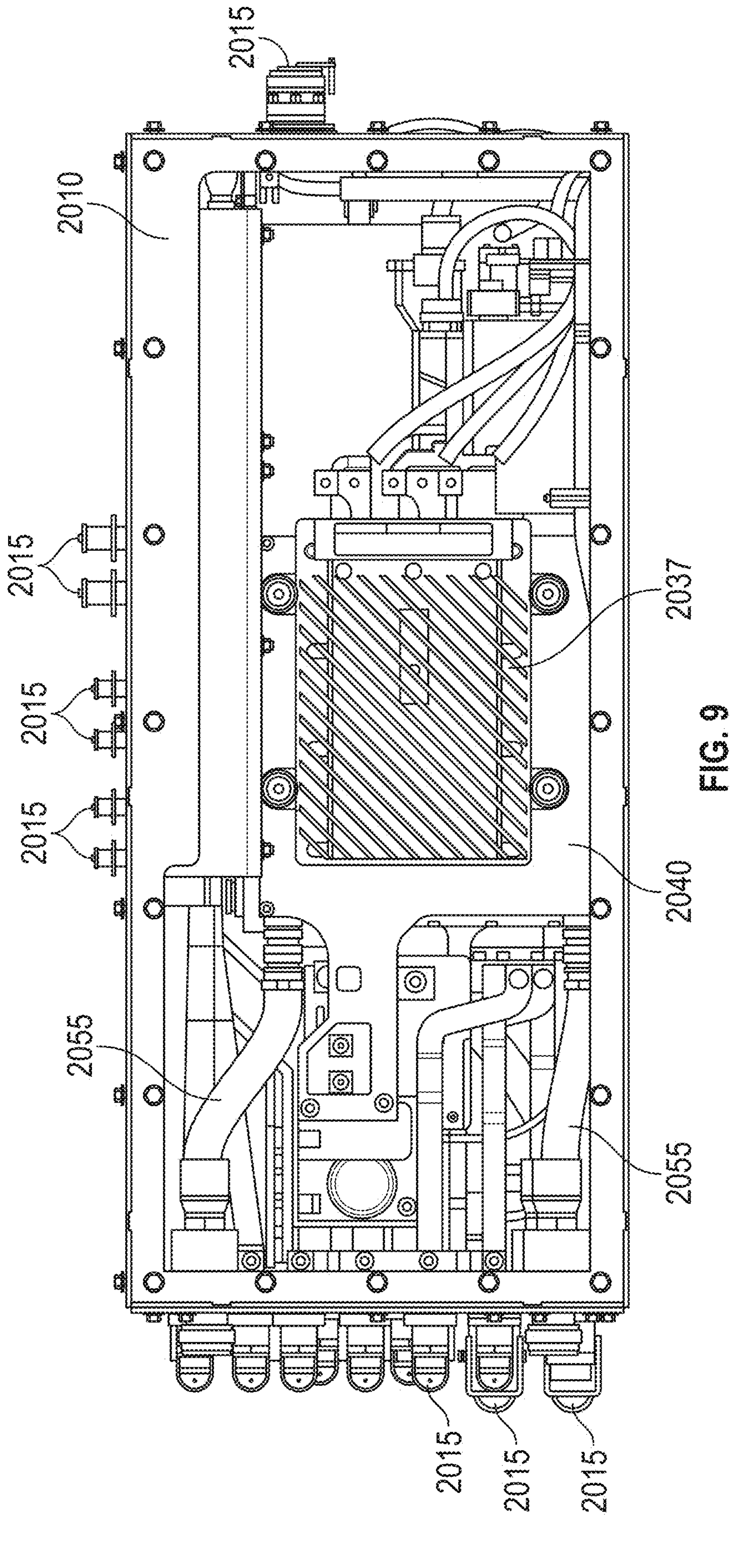
FIG. 9 is a side view of the power conversion unit illustrated in FIG. 4, according to some embodiments.
Figure 10:
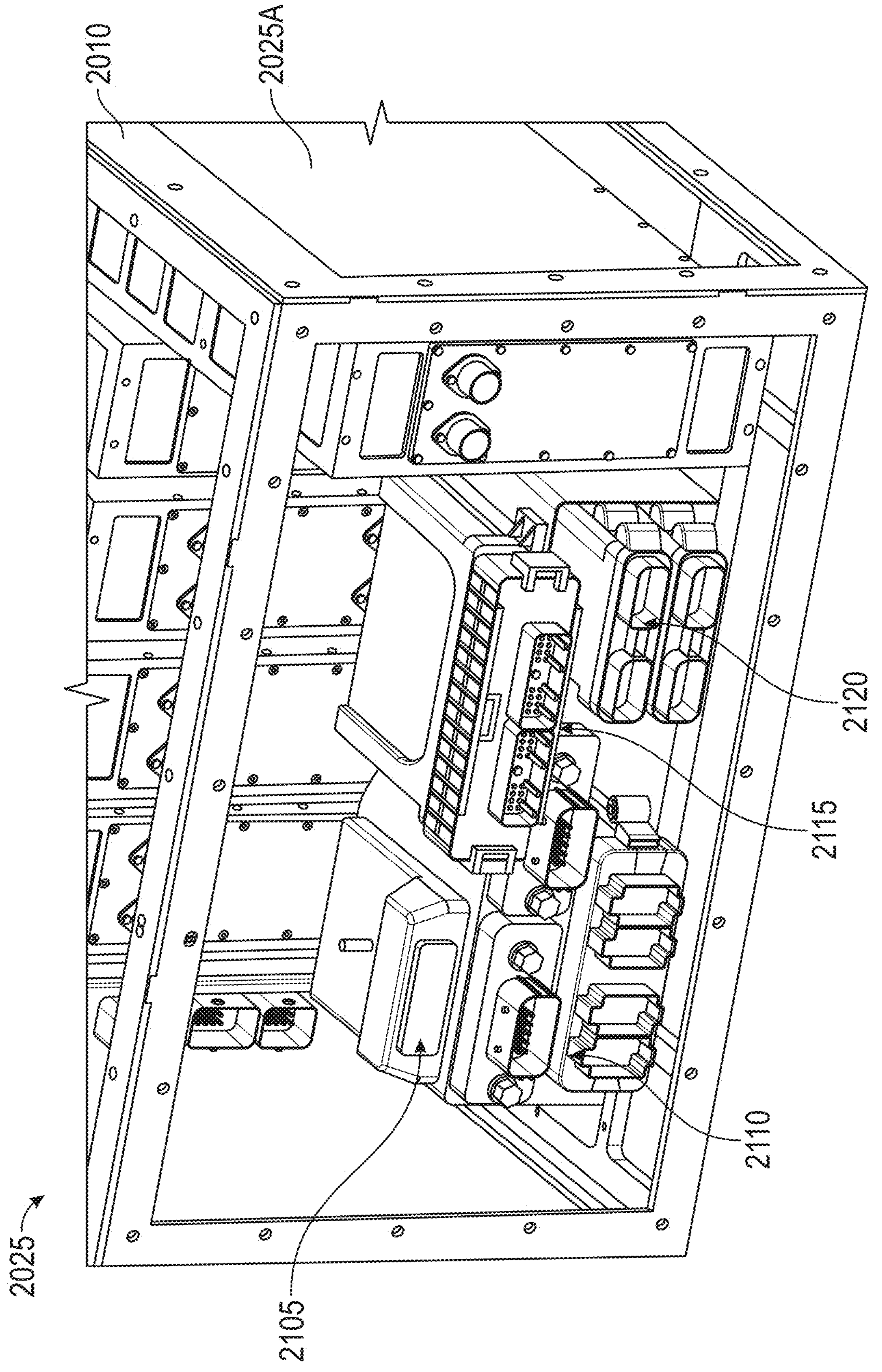
FIG. 10 is a side view of the power conversion unit illustrated in FIG. 4, according to some embodiments.

As shown in FIGS. 9 and 10, a side panel 2012 has been removed to show the internal component defined by the housing 2010. FIG. 9 illustrates an example of the cabling 2055 electrically coupling terminals 2015 with the power converter module 2025. FIG. 9 also illustrates an example of the cabling 2055 electrically coupling the power converter module 2025 with one or more control modules (e.g., components 2045). In some embodiments, the power conversion unit 2005 may include a power distribution module 2105, a bus hub 2110, an expansion module 2115, and safety relay modules 2120. For example, the power distribution module 2105 may be control the allocation or distribution of power between devices of the power conversion unit 2005.

Figure 11:
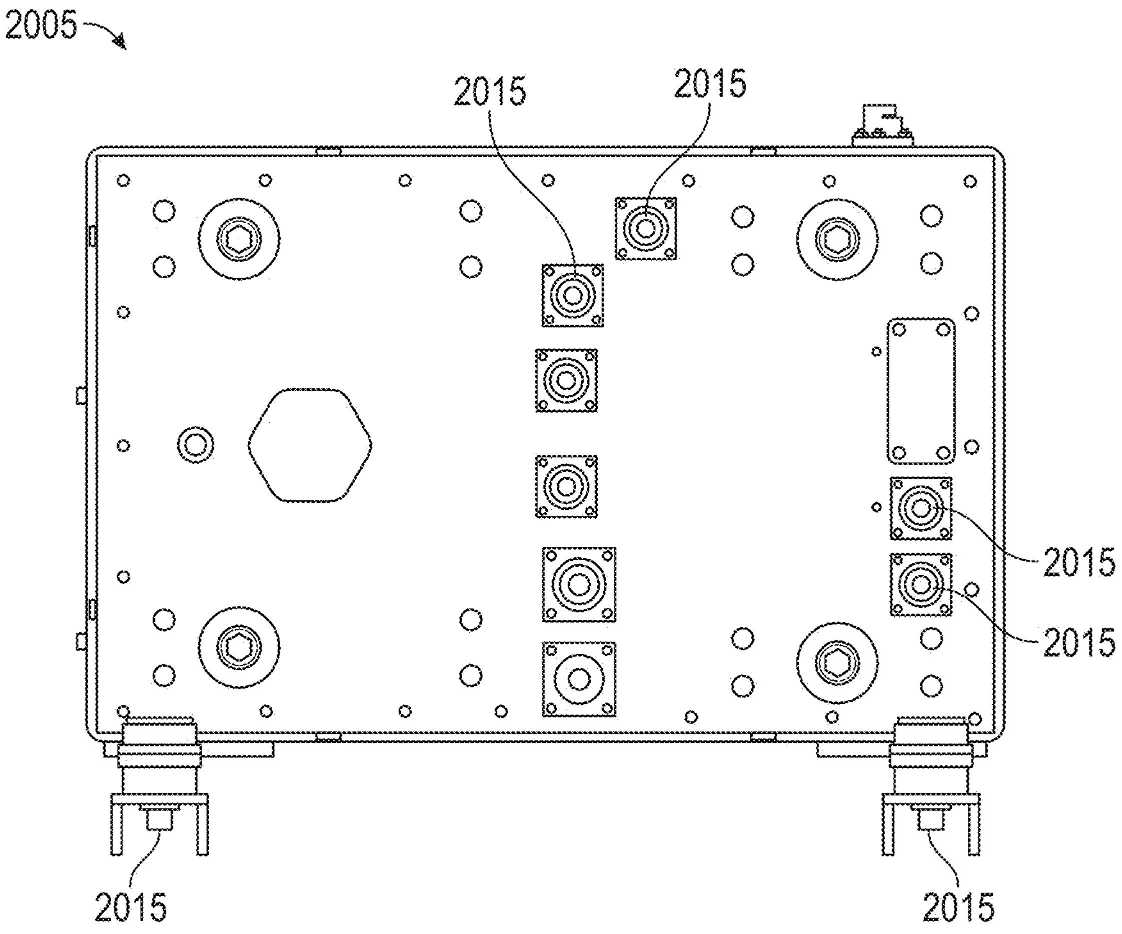
FIG. 11 is a perspective view of the power conversion unit illustrated in FIG. 4 arranged in a horizontal configuration, according to some embodiments.
Figure 12:
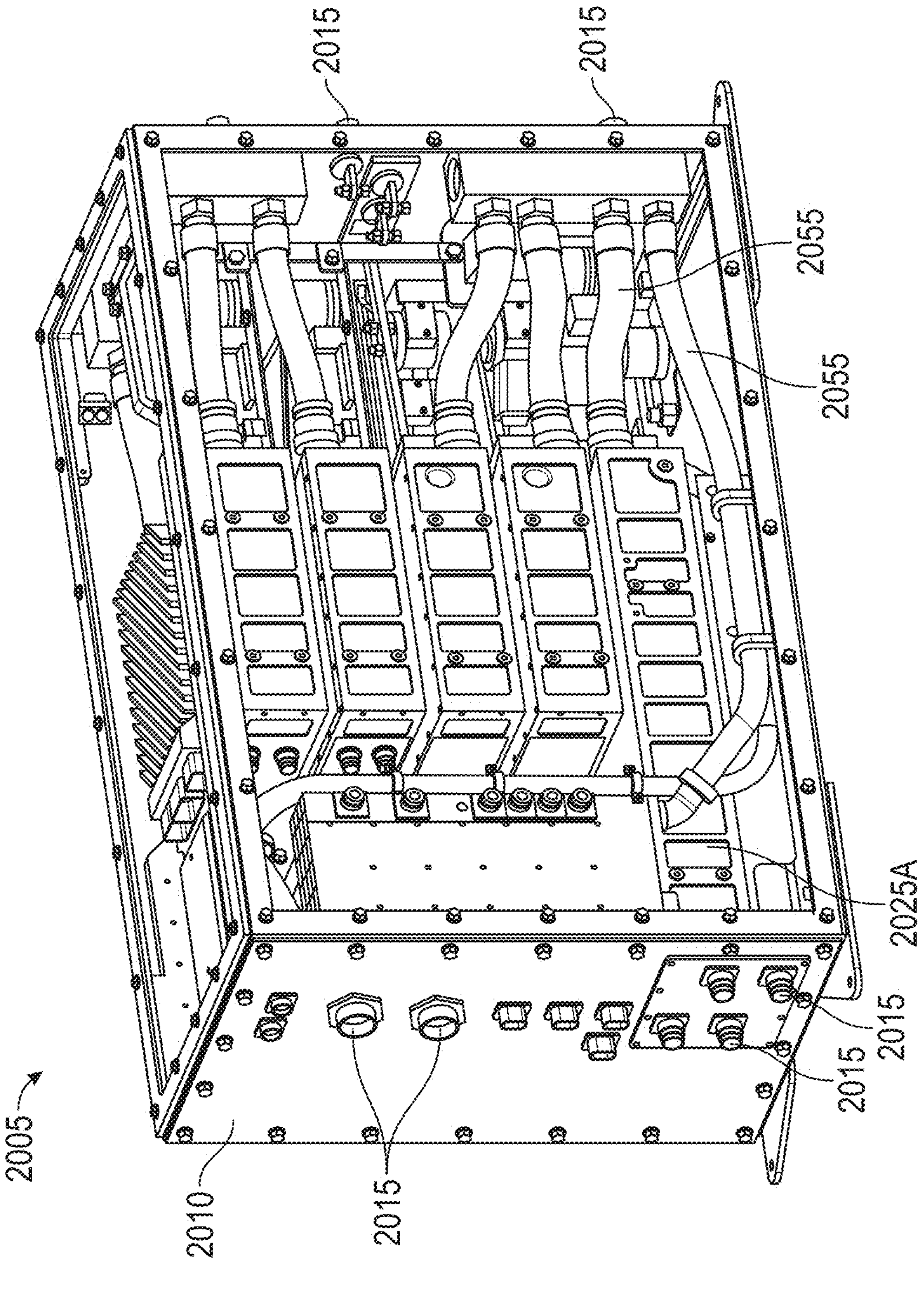
FIG. 12 is a perspective of the power conversion unit illustrated in FIG. 4 arranged in a vertical configuration, according to some embodiments.

In some embodiments, the power conversion unit 2005 may include at least one configuration, arrangement, and/or orientation. For example, the power conversion unit 2005 may be placed in a vertical orientation. As another example, the power conversion unit 2005 may be placed in a horizontal orientation. FIG. 11 depicts an example of the power conversion unit 2005 placed in the horizontal orientation. FIG. 12 depicts an example of the power conversion unit 2005 placed in the vertical orientation.

Figure 13:
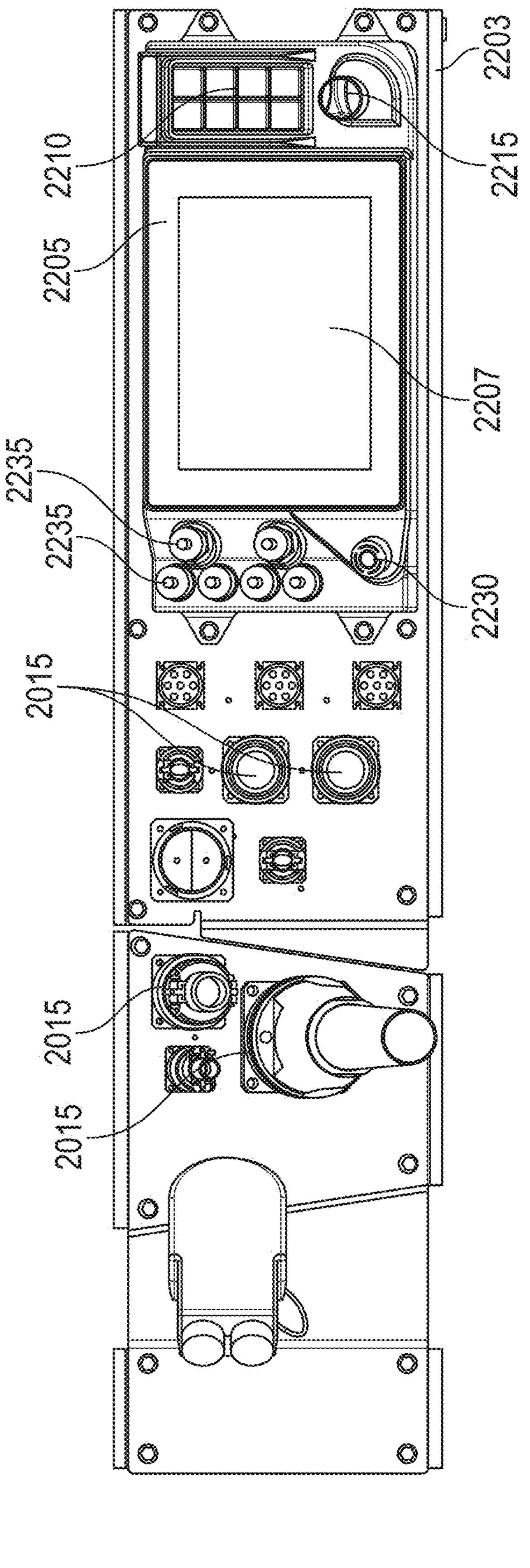
FIG. 13 is a perspective view of a panel included in the power conversion unit illustrated in FIG. 4, according to some embodiments.
Figure 14:
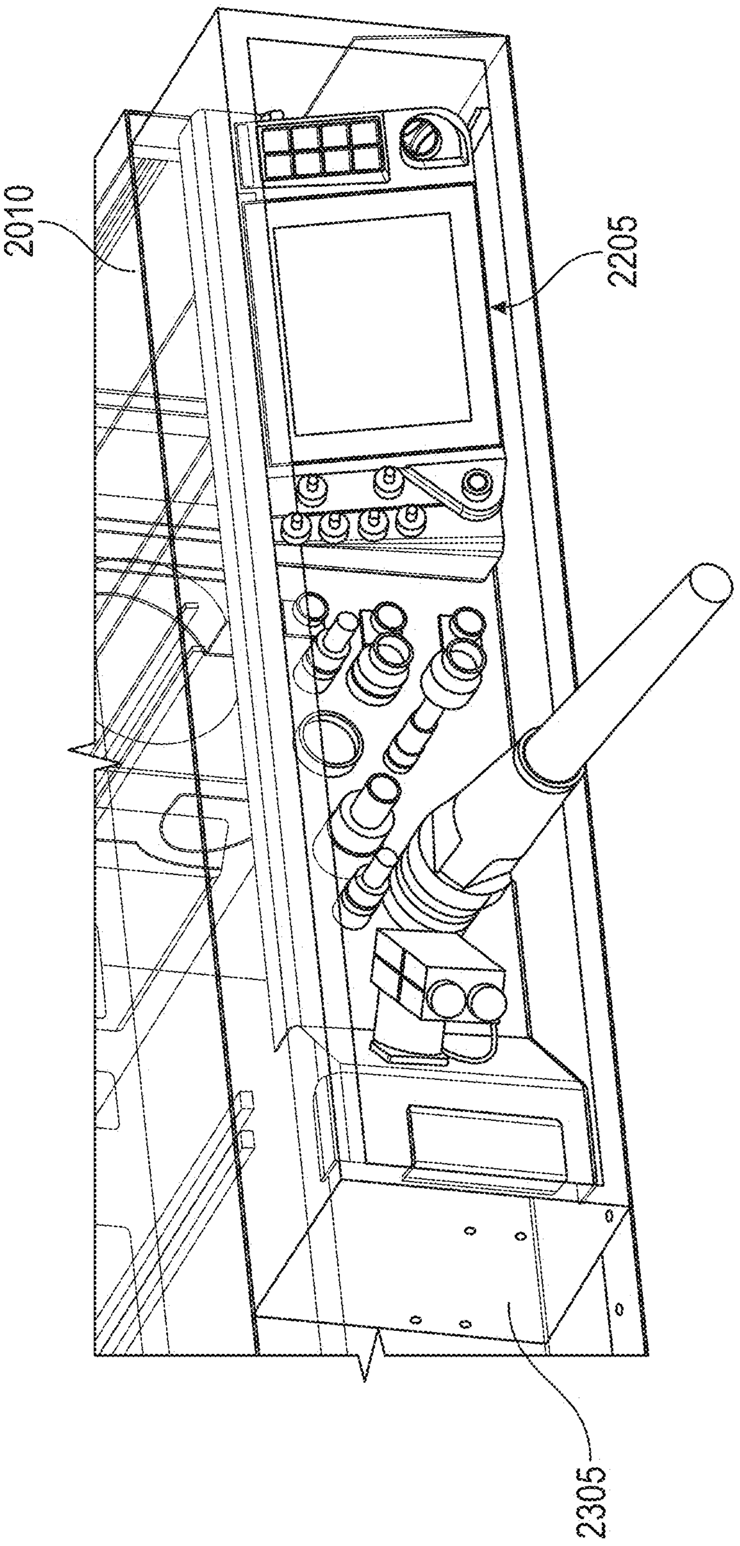
FIG. 14 is a perspective view of a panel included in the power conversion unit illustrated in FIG. 4, according to some embodiments.

FIGS. 13-14 depict perspective views of a panel 2203, according to some embodiments. In some embodiments, the power conversion unit 2005 may include the panel 2203. For example, the panel 2203 may be included in the housing 2010. As another example, the panel 2203 may be coupled to at least one of the panels 2012. In some embodiments, the panel 2203 and/or at least a portion thereof may be disposed in and/or otherwise located in a recess 2305. For example, as illustrated in FIG. 14, at least a portion of the 2203 is shown located in the recess 2305 of the housing 2010.

In some embodiments, the panel 2203 may include and/or otherwise house at least one of the terminals 2015, an interface device 2205, a keypad 2210, a key switch 2215, buttons 2235, and e-stop button 2230. In some embodiments, the interface device 2205 may include at least one display 2207. For example, the interface device 2205 may include a screen, a monitor, a graphical interface display, etc. In some embodiments, an operator of the interface device 2205 may control or otherwise dictate operation of the power conversion unit 2005. For example, the operator may select a first icon or element of a user interface, displayed by the display 2207, to indicate a given device to provide electrical power to.

In some embodiments, the interface device 2205 may include a touch screen display (e.g., the display 2207) that receives inputs to control operation of the power conversion unit 2005 and/or the power converter modules 2025. For example, the display 2207 may receive one or more operational instructions regarding the power conversion unit 2005. The interface device 2205 may also present, via the display 2207, information such as, diagnostic and/or maintenance alerts, live data visualization, control capability indications, and/or other possible types of information. In some embodiments, the interface device 2205 and/or one or more components thereof may be separable from the power conversion unit 2005 such that the interface device 2205 may be included in a different device. For example, the interface device 2205 may be included in a cab of the vehicle 10. As another example, the interface device 2205 may be included in and/or implemented as a tablet, a computer, etc. In some embodiments, the interface device 2205 may include network devices and/or communication circuitry such that the interface device 2205 includes point to point connections with the power conversion unit 2005 and/or the power converter modules 2025. In other embodiments, the interface device 2205 may provide and/or establish wireless and remote interfaces such that the power conversion unit 2005 may be controlled and/or operated by a remote operator.

Figure 15:
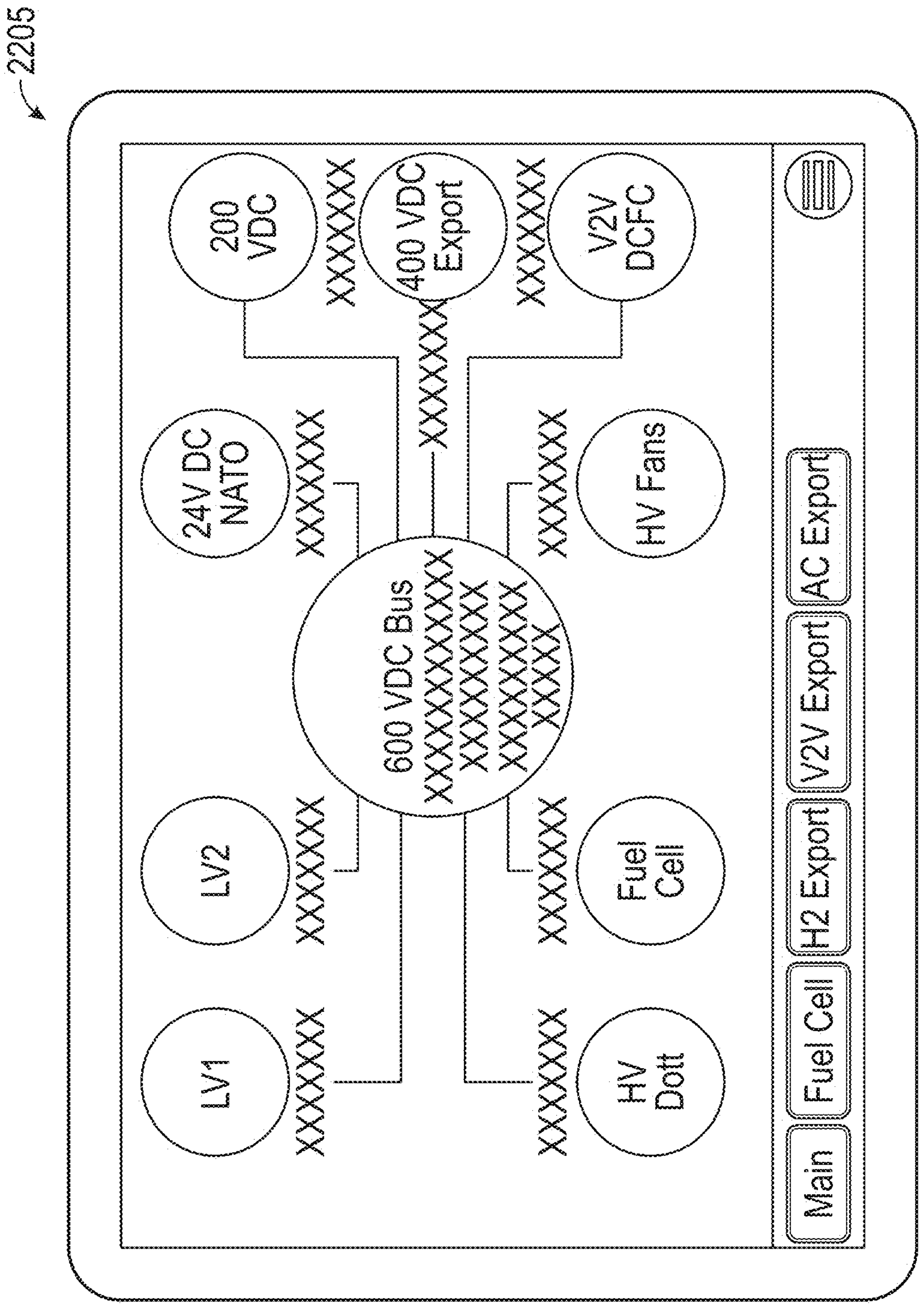
FIG. 15 is a perspective view of an interface device included in the power conversion unit illustrated in FIG. 4, according to some embodiments.

FIG. 15 depicts a perspective view of the interface device 2205, according to some embodiments. In some embodiments, the interface device 2205 may generate, provide, present, and/or otherwise display at least one user interface. For example, as shown in FIG. 15, the interface device 2205 may display a user interface that includes one or more elements (e.g., icons, buttons, interactive zones, etc.) to control operation of the power conversion unit 2005. In some embodiments, the interface device 2205 may display a user interface to indicate and/or illustrate operation of the power conversion unit 2005. For example, the interface device 2205 may display a user interface that indicates a charge status of one or more devices coupled with the power conversion unit 2005. As another example, the interface device 2205 may display a user interface that indicates a power output (e.g., power export) of a given power source.

Figure 16:
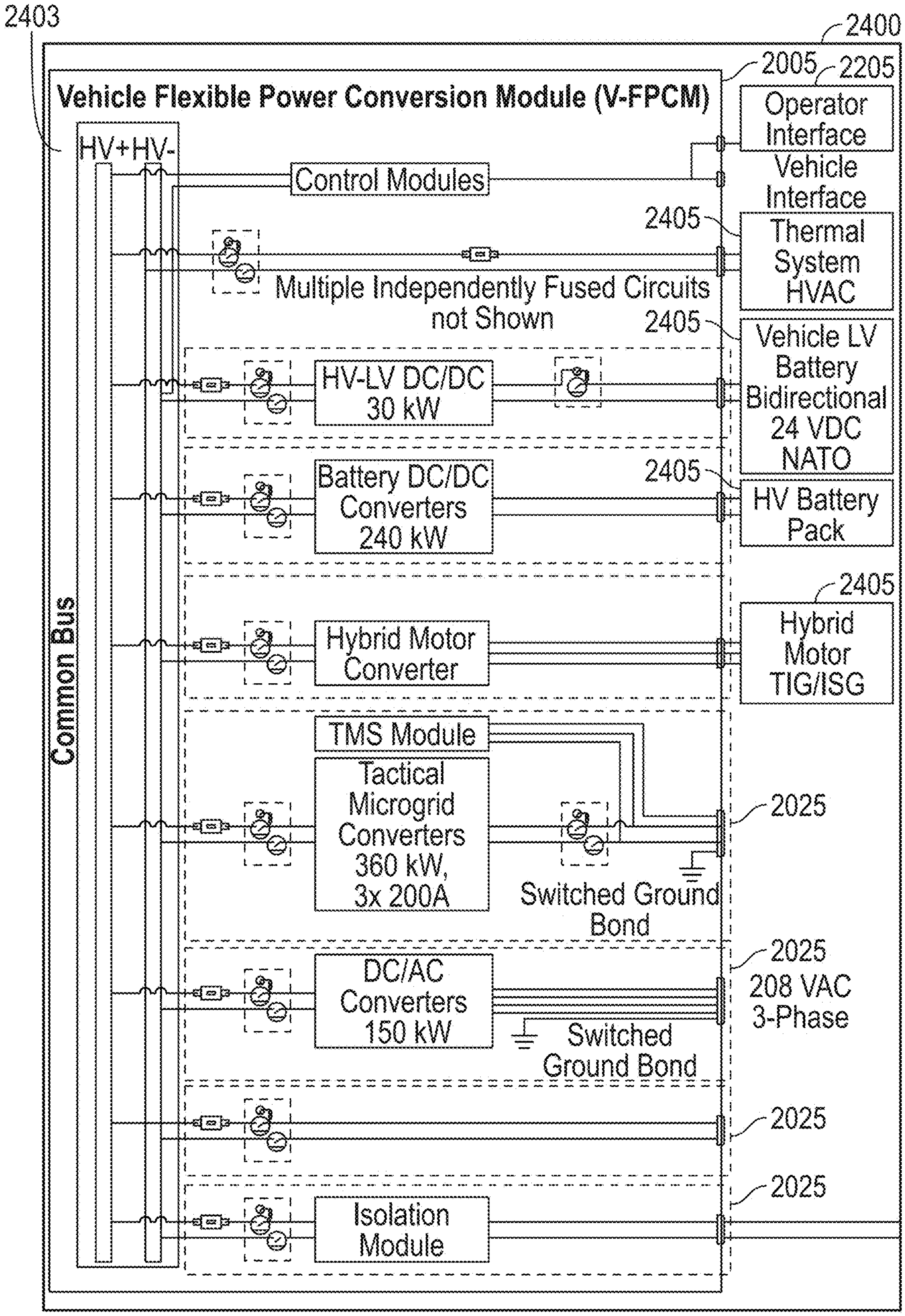
FIG. 16 is a schematic diagram of one or more components included in the power conversion unit illustrated in FIG. 4, according to some embodiments.

FIG. 16 depicts a schematic diagram 2400 of one or more components included in the power conversion unit 2005, according to some embodiments. For example, the schematic diagram 2400 may illustrate and/or represent circuit diagrams and/or electrical connections between components of the power conversion unit 2005. In some embodiments, the power conversion unit 2005 may include at least one bus 2403 (e.g., voltage bus, communication bus, connection bus, etc.) to establish connections between various components. For example, the bus 2403 may electrically couple the power converter module 2025*a* with the power converter module 2025*b*. As another example, the bus 2403 may electrically couple the interface device 2205 with an internal power source of the power conversion unit 2005.

As shown in FIG. 16, the bus 2403 may provide and/or receive electrical power from at least one power converter module 2025. For example, the bus 2403 may receive electrical power from a 208 VAC source (e.g., power source, power device, etc.) to provide electrical power to one or more components of the power conversion unit 2005. Stated otherwise, the 208 VAC source may serve as the power supply to provide electrical power to one or more devices coupled with the power conversion unit 2005. In some embodiments, the 208 VAC source is optional and/or removable. For example, the power conversion unit 2005 may not be coupled with and/or connected to a 208 VAC source.

In some embodiments, the power conversion unit 2005 may be coupled with, via the terminals 2015, at least one device 2405. The devices 2405 may refer to and/or include at least one power sources, power supplies, and/or loads. For example, the devices 2405, as shown in FIG. 16, include thermal management systems, heating ventilation air conditioning (HVAC) systems, low voltage batteries, high voltage battery packs, hybrid motors (e.g., TIG, ISG, etc.), and microgrid. In some embodiments, the power conversion unit 2005 may control and/or otherwise orchestrate the flow of electrical power, via the bus 2403, between the devices 2405. For example, the power conversion unit 2005 may receive power from the hybrid motors (e.g., a first device 2405) and subsequently provide, via the bus 2403, electrical power to the thermal systems (e.g., a second device 2405).

In some embodiments, the power conversion unit 2005 may include circuitry and/or hardware such as sensors and/or safety relays to control operation of the power converter modules 2025. Additionally, and/or alternatively, the power conversion unit 2005 may include fuses, positive terminals, positive connectors, negative terminals, negative connectors, contactors, pre-charged circuits disposed between the bus 2403 and the power converter modules 2025. The power conversion unit 2005 may include isolation monitors located on export connections such that the export connections and/or one or more devices electrically coupled with the export connections may be enabled and/or disabled. The power conversion unit 2005 may also include ground fault monitors. In some embodiments, the power conversion unit 2005 may include circuitry and/or hardware to trigger and/or perform alert notification responsive to faults, malfunctions, failures, etc. For example, the power conversion unit 2005 may include circuitry to cause the interface device 2205 to display a warning message.

Figure 17:
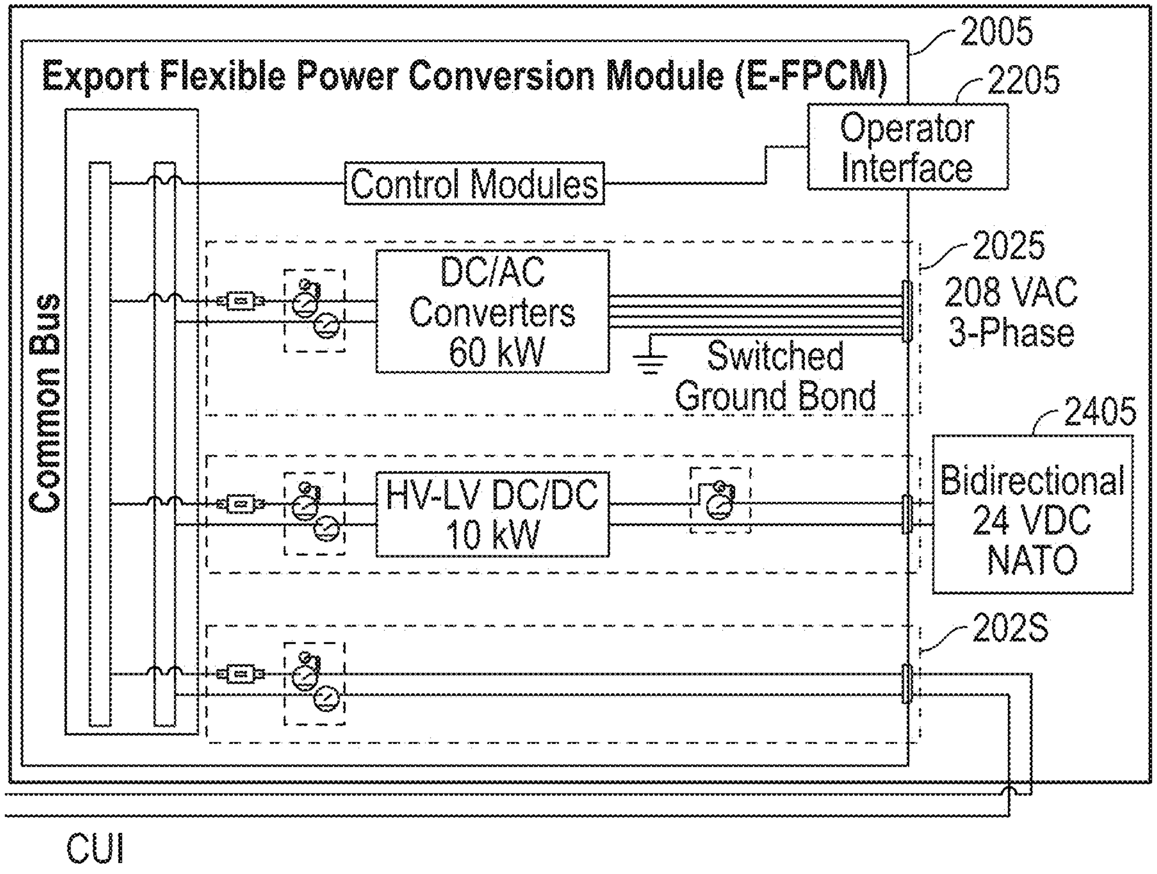
FIG. 17 is a schematic diagram of one or more components included in a power converter module, according to some embodiments.

FIG. 17 depicts a schematic diagram of the power converter module 2025, according to some embodiments. For example, FIG. 17 illustrates one or more devices, components, and/or circuitry included in the power converter module 2025. As shown in FIG. 17, the power converter module 2025 includes control modules (e.g., control logic devices, relays, switches, etc.), power converters (DC to AC, DC to DC, AC to DC, etc.), a bus, and the devices 2405 (shown as an internal power source in FIG. 17). In some embodiments, the schematic diagram, as shown in FIG. 17, may represent at least one of the various power converter modules described herein. For example, the schematic diagram, as shown in FIG. 17, may represent a power converter module 2025 that receives electrical power from a 208 VAC source. As another example, the schematic diagram, as shown in FIG. 17, may represent a power converter module 2025 that receives power from a DC source (e.g., a battery, energy storage device, etc.).

Figure 18:
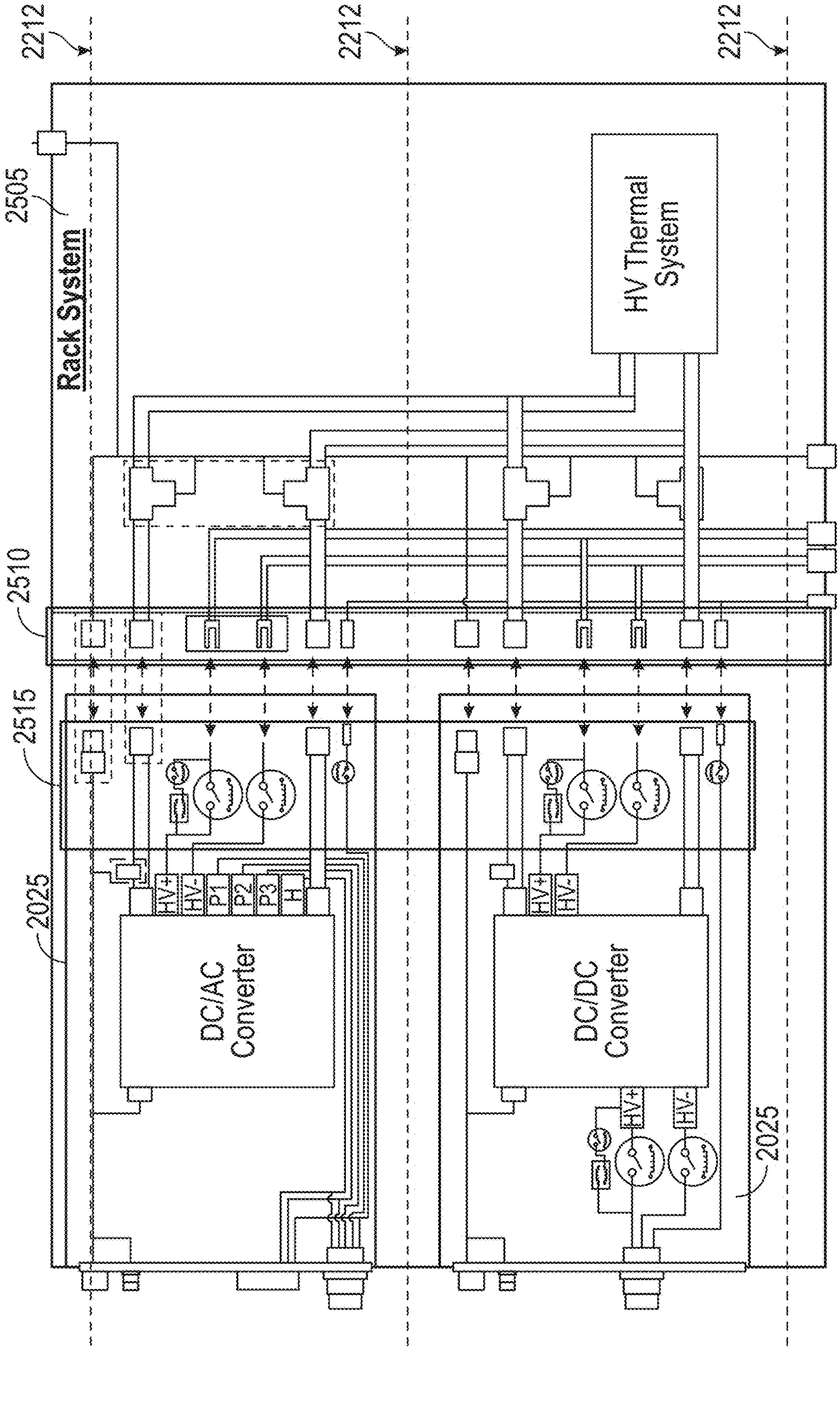
FIG. 18 is a schematic diagram of one or more components included in the power conversion unit illustrated in FIG. 4, according to some embodiments.

FIG. 18 depicts a schematic diagram of the power conversion unit 2005, according to some embodiments. As shown in FIG. 18, the power conversion unit 2005 includes a rack system 2505 to receive the power converter modules 2025. For example, the rack system 2505 may include and/or refer to the one or more slots of the housing 2010. In some embodiments, the slots, as illustrated by lines 2212, may refer to and/or define a space for a given power converter module 2025. For example, a first line 2212 and a second line 2212 may define an area for a first power converter module 2025.

In some embodiments, the rack system 2505 may include a liquid cooled thermal system to cool and/or control the temperature of the power converter modules 2025. The thermal system may include at least one of a coolant pump, a radiator, and a cooling fan. In some embodiments, the thermal system and/or one or more components thereof may receive power from the bus 2403. In some embodiments, the rack system 2505 may include sensors to detect and/or check for coolant leaks. The power conversion unit 2005 may disable, deactivate, and/or otherwise isolate a given power converter module 2025 associated with a thermal system that is experiences a coolant leak or coolant drip to protect the power converter module 2025 and/or the power conversion unit 2005 from damage resulting from the leak.

In some embodiments, the first power converter module 2025 may be removably coupled with the power conversion unit 2005. For example, as shown in FIG. 18, the rack system 2505 includes rack interfaces 2510 including one or more connectors or terminals to couple the power converter modules 2025 with the power conversion unit 2005. In some embodiments, a first power converter module 2025 may include connectors 2515 to removably couple with the rack interfaces 2510. For example, the connectors 2515 may decouple (e.g., disconnect) from the rack interfaces 2510 to decouple the first power converter module 2025 from the power conversion unit 2005.

In some embodiments, the rack system 2505 may electrically couple the power converter modules 2025 with at least one of loads, power supplies, electrical devices, etc. For example, the rack system 2505 may electrically couple the power converter modules 2025 to the power sources 2000. As another example, the rack system 2505 may electrically couple the power converter modules 2025 with the devices 2405.

Figure 19:
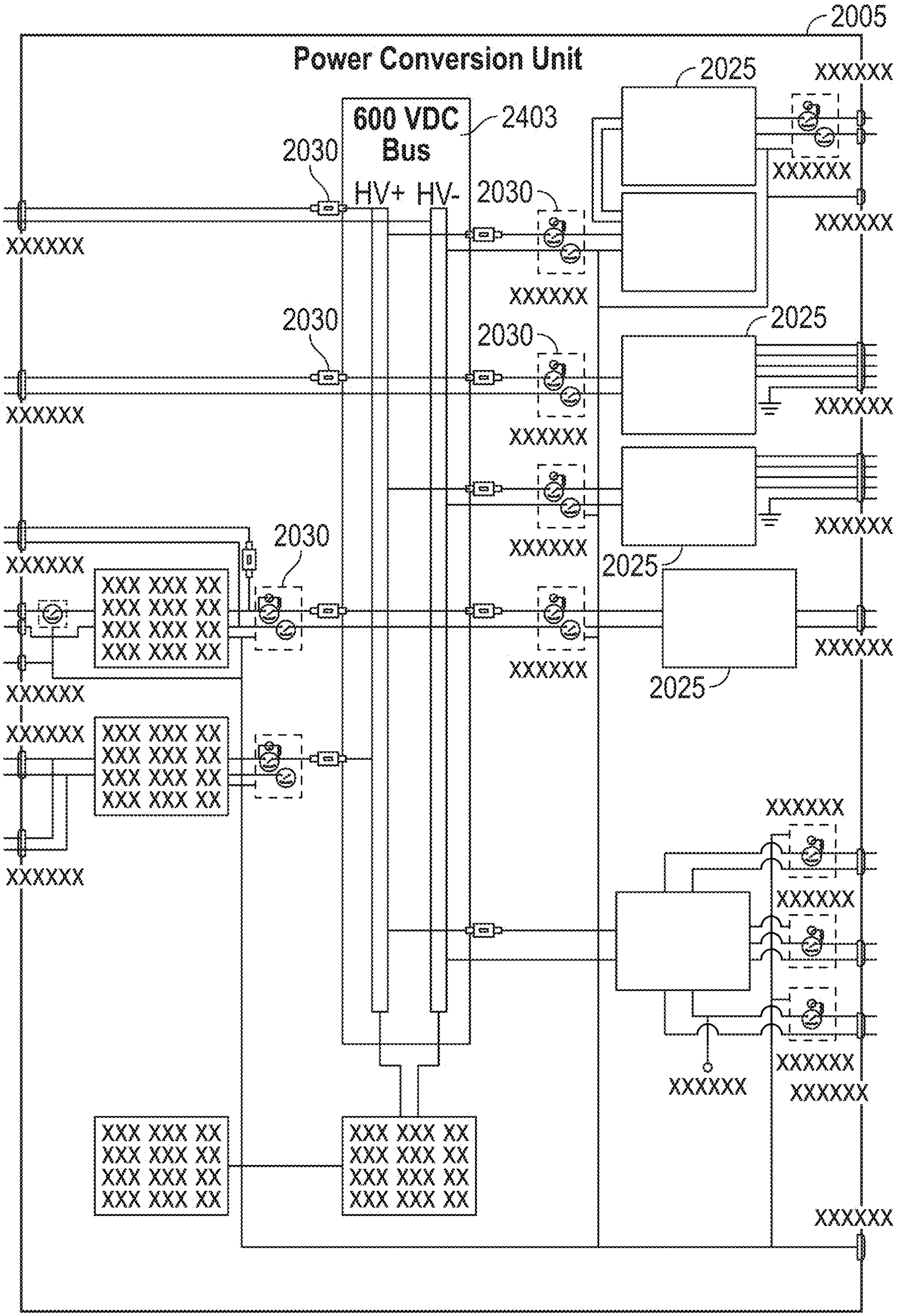
FIG. 19 is a schematic diagram of one or more components included in the power conversion unit illustrated in FIG. 4, according to some embodiments.

FIG. 19 depicts a schematic diagram of one or more components of the power conversion unit 2005, according to some embodiments. As shown in FIG. 19, the power conversion modules 2025 may be electrically coupled with one another via the bus 2403. In some embodiments, the power conversion unit 2005 may establish bi-directional flow such that electrical power may be provided to the bus 2403 by a first power converter module 2025 to power a second power converter module 2025. Stated otherwise, a first power converter module 2025 may serve as a power supply for a second power converter module 2025. In some embodiments, the power converter modules 2025 may be bi-directional such that the power converter modules 2025 may receive electrical power from a given device and/or provide electrical power to the given device. Stated otherwise, the power converter modules 2025 may receive power from a device (while the device is acting as a power supply) and the power converter modules 2025 may provide power to the device (while the device is acting as a load).

As shown in FIG. 19, the power converter modules 2025 may be electrically coupled with the bus 2403 by one or more switches and/or relays (illustrated by reference number 2530 in FIG. 19) such that a given power converter module 2025 may be disconnected from and/or connected to the bus 2403. In some embodiments, the power converter modules 2025 may be coupled with and/or decoupled from the bus 2403 based on signals provided to the interface device 2205. For example, a first input, provided to the interface device 2205, may cause a given power converter module 2025 to be decoupled from the bus 2403. As another example, the given power converter module 2025 may be decoupled form the bus 2403 responsive to the given power converter module 2025 be disconnected from the rack system 2505.

Figure 20:
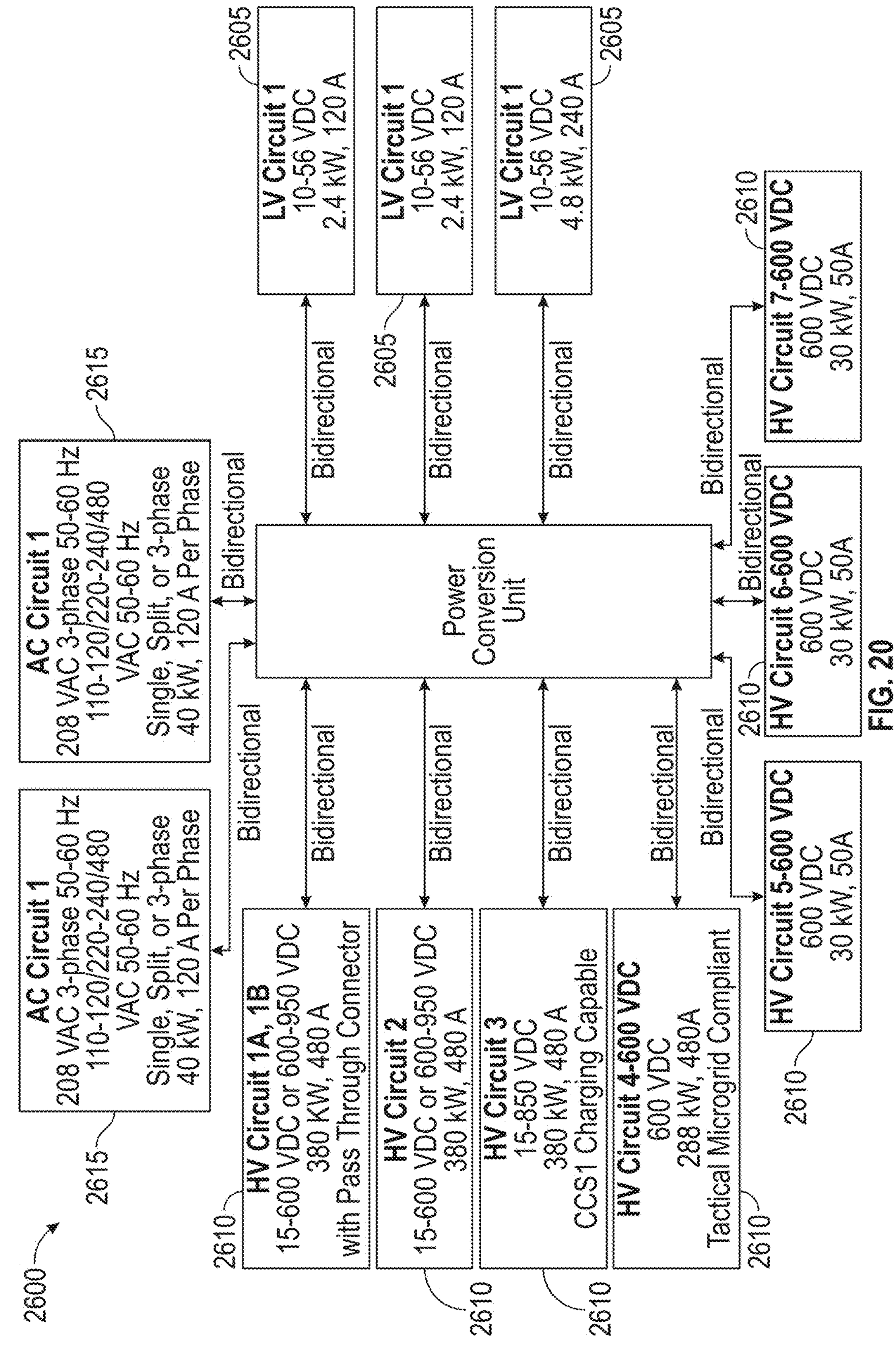
FIG. 20 is a block diagram of a system that includes one or more components of the power conversion unit illustrated in FIG. 4, according to some embodiments.

FIG. 20 depicts a block diagram of a system 2600 that includes one or more components of the power conversion unit 2005, according to some embodiments. In some embodiments, the system 2600 may illustrate and/or represent bi-directional flow of electrical power between devices coupled with the power conversion unit 2005. For example, the power conversion unit 2005 may establish bi-directional flow with one or more low voltage (LV) circuits 2605 such that the LV circuits 2605 may receive power from the power conversion unit 2005 and/or provide power to the power conversion unit 2005. As another example, the power conversion unit 2005 may establish bi-directional flow with one or more high voltage (HV) circuits 2610 such that the HV circuits 2610 may receive power from the power conversion unit 2005 and/or provide power to the power conversion unit 2005. As another example, the power conversion unit 2005 may establish bi-directional flow with one or more AC circuits 2615 such that the AC circuits 2615 may receive power from the power conversion unit 2005 and/or provide power to the power conversion unit 2005.

Figure 21:
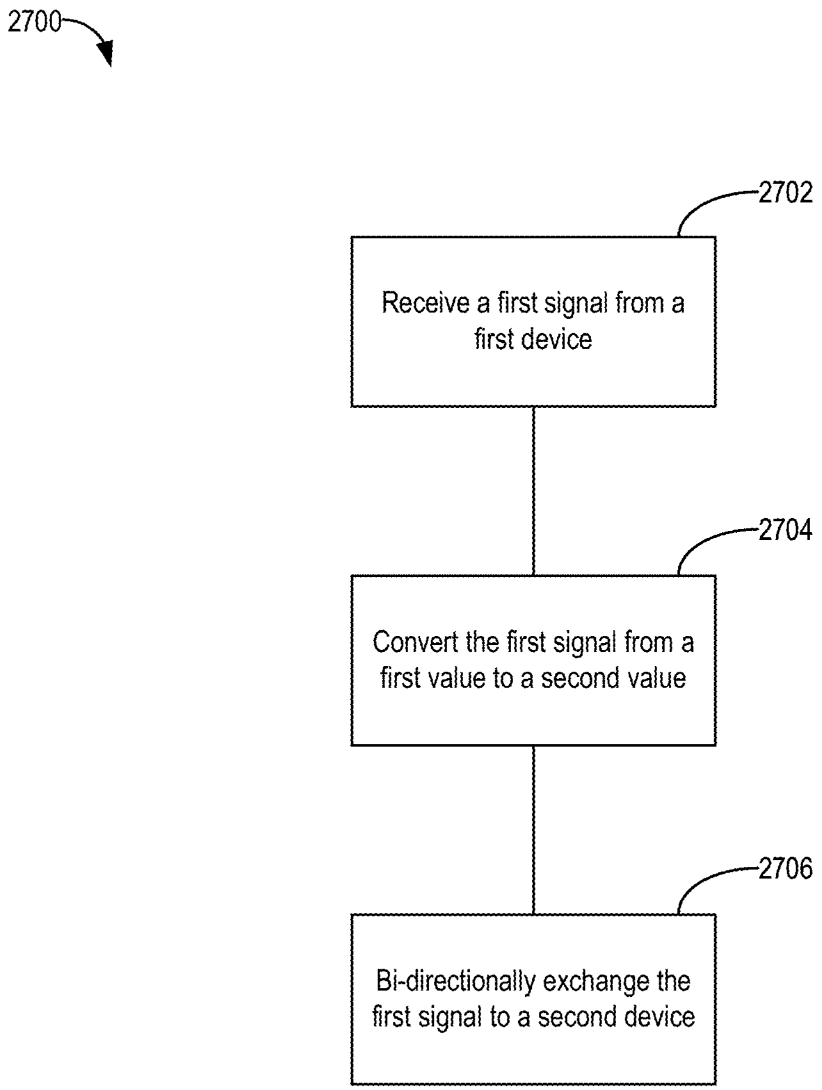
FIG. 21 is a flow diagram of a method to orchestrate power conversion between bi-directionally connected devices, according to some embodiments.

FIG. 21 is a flow diagram of a method 2700 to orchestrate power conversion between bi-directionally connected devices, according to some embodiments. In some embodiments, the power conversion unit 2005 and/or one or more components thereof may perform the method 2700 and/or one or more steps thereof. The method 2700 and/or one or more steps thereof may be modified such that one or more steps may be separated, combined, altered, omitted, repeated, replicated, reproduced, and/or otherwise changed. In some embodiments, the power conversion unit 2005 may perform the method 2700 responsive to the establishment of one or more connections with the power conversion unit 2005.

At step 2702, a first signal may be received from a first device. For example, the power conversion unit 2005 may receive electrical power (e.g., the first signal) from the power sources 2000. As another example, the power conversion unit 2005 may receive electrical power from the device 2405. In some embodiments, the power conversion unit 2005 may receive electrical power from a device serving as a power source (e.g., a device that is providing electrical power to the power conversion unit 2005). For example, the power conversion unit 2005 may receive electrical power from an electric grid.

In some embodiments, the power conversion unit 2005 may receive electrical power having one or more characteristics and/or properties. For example, the power conversion unit 2005 may receive 120 VAC. As another example, the power conversion unit 2005 may receive three-phase power. As even another example, the power conversion unit 2005 may receive 300 VDC.

At step 2704, the first signal may be converted from a first value to a second value. For example, the first signal may include power having a first voltage level. As another example, the first signal may include AC power and/or DC power. In some embodiments, the power conversion unit 2005 may convert the first signal from the first value to the second value by adjusting one or more properties of the first signal. For example, the power conversion unit 2005 may, via the power converter modules 2025, convert the first signal from AC power to DC power. As another example, the power conversion unit 2005 may convert the first signal from 300 VDC to 60 VDC.

In some embodiments, the power conversion unit 2005 may convert the first signal such that the first device may serve as a power source to one or more second devices. Stated otherwise, the power conversion unit 2005 may convert the first signal so that electrical power may be provided from the first device to one or more second devices.

At step 2706, the first signal may be bi-directionally exchanged with a second device. For example, the power conversion unit 2005 may provide the first signal to the devices 2405 responsive to the conversion of the first signal in step 2704. As another example, the power conversion unit 2005 may provide the first signal to one or more devices having bi-directional flow with the power conversion unit 2005.

In some embodiments, the bus 2403 may provide the first signal to one or more bi-directionally connected devices based on the voltage level of the first signal being applied to the bus 2403. For example, a first power converter module 2025 may receive the first signal from the device and then convert the first signal. To continue this example, the first power converter module 2025 may then apply to provide the converted first signal to the bus 2403 such that the first signal may then be provided to one or more connected devices via one or more second power converter modules 2025.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A vehicle, comprising:

a first power source configured to supply electrical power to one or more components of the vehicle;

a frame; and a power conversion unit coupled with the frame, the power conversion unit comprising:

a housing configured to:

define a shape of the power conversion unit;

provide a first slot dimensioned to (i) receive a first converter module and (ii) align the first converter module with one or more first interfaces to couple the first converter module with the power conversion unit; and provide a second slot dimensioned to (i) receive a second converter module and (ii) align the second converter module with one or more second interfaces to couple the second converter module with the power conversion unit;

the first converter module electrically coupled with the first power source, and the first converter module configured to establish a first bi-directional flow of electrical power between a voltage bus of the power conversion unit and the first power source;

the second converter module configured to:

electrically couple with a second power source; and establish a second bi-directional flow of electrical power between the voltage bus of the power conversion unit and the second power source; and the voltage bus configured to establish a third bi-directional flow of electric power such that power flows between the first converter module and the second converter module.

2. The vehicle of claim 1, wherein the first power source is one or more batteries configured to store electrical power, wherein the second power source is an electrical grid, and comprising:

the second converter module further comprising:

a first power converter configured to:

receive, from the electrical grid, an alternating current signal having a first voltage level;

convert, responsive to receipt of the alternating current signal, the alternating current signal to a direct current signal having a second voltage level; and provide, responsive to conversion of the alternating current signal, the direct current signal to the first converter module via the voltage bus; and the first converter module further comprising:

a second power converter configured to:

receive, via the voltage bus, the direct current signal having the second voltage level;

convert, responsive to receipt of the direct current signal, the direct current signal from the second voltage level to a third voltage level; and provide, responsive to conversion of the direct current signal, the direct current signal having the third voltage level to the one or more batteries to charge the one or more batteries.

3. The vehicle of claim 1, the power conversion unit further comprising:

an input/output device configured to receive one or more inputs to control at least one of the first bi-directional flow of electrical power or the second bi-directional flow of electrical power; and one or more control modules configured to receive, from the input/output device, the one or more inputs to activate one or more relays to control at least one of the first bi-directional flow of electrical power or the second bi-directional flow of electrical power.

4. The vehicle of claim 1, the power conversion unit configured to decouple from the frame such that the power conversion unit is removable from the vehicle with the first converter module electrically coupled with the first power source.

5. The vehicle of claim 1, wherein the first power source includes one or more batteries configured to store electrical power, and the first converter module further comprising:

a power converter configured to:

receive, from the first power source, a direct current signal having a first voltage level;

convert, responsive to receipt of the direct current signal, the direct current signal from the first voltage level to a second voltage level; and provide, responsive to conversion of the direct current signal, the direct current signal having the second voltage level to a first component configured to receive the second voltage level.

6. The vehicle of claim 1, wherein the first power source includes a generator, and the first converter module further comprising:

a power converter configured to:

receive, from the first power source, an alternating current signal having a first voltage level;

convert, responsive to receipt of the alternating current signal, the alternating current signal to a direct current signal having a second voltage level; and provide, responsive to conversion of the alternating current signal, the direct current signal having the second voltage level to a first component configured to receive the second voltage level.

7. The vehicle of claim 1, wherein the first bi-directional flow of electrical power between the voltage bus of the power conversion unit and the first power source includes:

the first power source providing electrical power to the voltage bus with the first power source serving as a power supply; and the first power source receiving electrical power from the voltage bus with the first power source serving as an electrical load.

8. The vehicle of claim 7, wherein the second bi-directional flow of electrical power between the voltage bus of the power conversion unit and the second power source includes:

the second power source providing electrical power to the voltage bus with the second power source serving a second power supply; and the second power source receiving electrical power from the voltage bus with the second power source serving as a second electrical load.

9. The vehicle of claim 1, the power conversion unit further comprising:

a third converter module electrically coupled with an electrical load; and the third converter module configured to establish a fourth bi-directional flow of electrical power between the voltage bus and the electrical load.

10. The vehicle of claim 9, wherein the electrical load includes one or more high-voltage thermal systems.

11. The vehicle of claim 10, the third converter module comprising:

a power converter configured to:

receive, via the voltage bus, a signal from at least one of the first power source or the second power source, the signal having a first voltage level;

convert, responsive to receipt of the signal, the signal from the first voltage level to a direct current signal having a second voltage level; and provide, responsive to conversion of the signal, the direct current signal having the second voltage level to the one or more high-voltage thermal systems.

12. A system, comprising:

a vehicle, including:

a first power source configured to supply electrical power to one or more components of the vehicle; and a frame; and a power conversion unit coupled with the frame, the power conversion unit comprising:

a housing configured to:

define a shape of the power conversion unit;

provide a first slot dimensioned to (i) receive a first converter module and (ii) align the first converter module with one or more first interfaces to couple the first converter module with the power conversion unit; and provide a second slot dimensioned to (i) receive a second converter module and (ii) align the second converter module with one or more second interfaces to couple the second converter module with the power conversion unit;

the first converter module electrically coupled with the first power source, and the first converter module configured to establish a first bi-directional flow of electrical power between a voltage bus of the power conversion unit and the first power source;

the second converter module configured to:

electrically couple with a second power source; and establish a second bi-directional flow of electrical power between the voltage bus of the power conversion unit and the second power source; and the voltage bus configured to establish a third bi-directional flow of electric power such that power flows between the first converter module and the second converter module.

13. The system of claim 12, wherein the first power source is one or more batteries configured to store electrical power, wherein the second power source is an electrical grid, and comprising:

the second converter module further comprising:

a first power converter configured to:

receive, from the electrical grid, an alternating current signal having a first voltage level;

convert, responsive to receipt of the alternating current signal, the alternating current signal to a direct current signal having a second voltage level; and provide, responsive to conversion of the alternating current signal, the direct current signal to the first converter module via the voltage bus; and the first converter module further comprising:

a second power converter configured to:

receive, via the voltage bus, the direct current signal having the second voltage level;

convert, responsive to receipt of the direct current signal, the direct current signal from the second voltage level to a third voltage level; and provide, responsive to conversion of the direct current signal, the direct current signal having the third voltage level to the one or more batteries to charge the one or more batteries.

14. The system of claim 12, the power conversion unit further comprising:

an input/output device configured to receive one or more inputs to control at least one of the first bi-directional flow of electrical power or the second bi-directional flow of electrical power; and one or more control modules configured to receive, from the input/output device, the one or more inputs to activate one or more relays to control at least one of the first bi-directional flow of electrical power or the second bi-directional flow of electrical power.

15. The system of claim 12, wherein the first power source includes one or more batteries configured to store electrical power, and the first converter module further comprising:

a power converter configured to:

receive, from the first power source, a direct current signal having a first voltage level;

convert, responsive to receipt of the direct current signal, the direct current signal from the first voltage level to a second voltage level; and provide, responsive to conversion of the direct current signal, the direct current signal having the second voltage level to a first component configured to receive the second voltage level.

16. The system of claim 12, wherein the first power source includes a generator, and the first converter module further comprising:

a power converter configured to:

receive, from the first power source, an alternating current signal having a first voltage level;

convert, responsive to receipt of the alternating current signal, the alternating current signal to a direct current signal having a second voltage level; and provide, responsive to conversion of the alternating current signal, the direct current signal having the second voltage level to a first component configured to receive the second voltage level.

17. The system of claim 12, wherein the first bi-directional flow of electrical power between the voltage bus of the power conversion unit and the first power source includes:

the first power source providing electrical power to the voltage bus with the first power source serving as a power supply; and the first power source receiving electrical power from the voltage bus with the first power source serving as an electrical load.

18. A power conversion unit, comprising:

a housing configured to:

define a shape of the power conversion unit;

provide a first slot dimensioned to (i) receive a first converter module and (ii) align the first converter module with one or more first interfaces to couple the first converter module with the power conversion unit; and provide a second slot dimensioned to (i) receive a second converter module and (ii) align the second converter module with one or more second interfaces to couple the second converter module with the power conversion unit;

the first converter module electrically coupled with a first power source, and the first converter module configured to establish a first bi-directional flow of electrical power between a voltage bus of the power conversion unit and the first power source;

the second converter module configured to:

electrically couple with a second power source; and establish a second bi-directional flow of electrical power between the voltage bus of the power conversion unit and the second power source; and the voltage bus configured to establish a third bi-directional flow of electric power such that power flows between the first converter module and the second converter module.

19. The power conversion unit of claim 18, wherein the first power source is one or more batteries configured to store electrical power, wherein the second power source is an electrical grid, and comprising:

the second converter module further comprising:

a first power converter configured to:

receive, from the electrical grid, an alternating current signal having a first voltage level;

convert, responsive to receipt of the alternating current signal, the alternating current signal to a direct current signal having a second voltage level; and provide, responsive to conversion of the alternating current signal, the direct current signal to the first converter module via the voltage bus; and the first converter module further comprising:

a second power converter configured to:

receive, via the voltage bus, the direct current signal having the second voltage level;

convert, responsive to receipt of the direct current signal, the direct current signal from the second voltage level to a third voltage level; and provide, responsive to conversion of the direct current signal, the direct current signal having the third voltage level to the one or more batteries to charge the one or more batteries.

20. The power conversion unit of claim 18, further comprising:

an input/output device configured to receive one or more inputs to control at least one of the first bi-directional flow of electrical power or the second bi-directional flow of electrical power; and one or more control modules configured to receive, from the input/output device, the one or more inputs to activate one or more relays to control at least one of the first bi-directional flow of electrical power or the second bi-directional flow of electrical power.

* * * * *